US011390189B2

(12) United States Patent
Umetani

(10) Patent No.: US 11,390,189 B2
(45) Date of Patent: Jul. 19, 2022

(54) INFORMATION PROCESSING APPARATUS, INFORMATION PROCESSING METHOD, AND COMPUTER-READABLE RECORDING MEDIUM FOR RECORDING INFORMATION PROCESSING PROGRAM

(71) Applicant: Panasonic Intellectual Property Management Co., Ltd., Osaka (JP)

(72) Inventor: Hideo Umetani, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 16/527,092

(22) Filed: Jul. 31, 2019

(65) Prior Publication Data
US 2020/0039387 A1 Feb. 6, 2020

(30) Foreign Application Priority Data
Aug. 2, 2018 (JP) .............................. JP2018-146009

(51) Int. Cl.
*B60N 2/02* (2006.01)
*B60N 2/04* (2006.01)
*B60N 2/01* (2006.01)
*H04W 4/40* (2018.01)

(52) U.S. Cl.
CPC ............ *B60N 2/0224* (2013.01); *B60N 2/01* (2013.01); *B60N 2/04* (2013.01); *H04W 4/40* (2018.02)

(58) Field of Classification Search
None
See application file for complete search history.

(56) References Cited

U.S. PATENT DOCUMENTS

| 10,606,363 | B2 * | 3/2020 | Hoggarth | B60N 2/02 |
| 2006/0284587 | A1 | 12/2006 | Teshima et al. | |
| 2007/0290554 | A1 * | 12/2007 | Teshima | B60N 2/0244 296/64 |
| 2017/0213308 | A1 | 7/2017 | Wellborn et al. | |
| 2020/0047641 | A1 * | 2/2020 | D'Eramo | B60N 2/14 |
| 2020/0254906 | A1 * | 8/2020 | Luchner | B60K 35/00 |
| 2021/0033771 | A1 * | 2/2021 | Morabito | B60W 50/14 |
| 2021/0178936 | A1 * | 6/2021 | Yetukuri | B60N 2/12 |
| 2021/0354701 | A1 * | 11/2021 | Lee | B60W 60/001 |

FOREIGN PATENT DOCUMENTS

| JP | 2005-38379 | | 2/2005 | |
| JP | 2006-347351 | | 12/2006 | |
| JP | 2009-15521 | | 1/2009 | |
| JP | 2020140341 | A * | 9/2020 | |
| KR | 20070120435 | A * | 6/2007 | |
| WO | WO-0230704 | A1 * | 4/2002 | A61G 3/062 |

* cited by examiner

*Primary Examiner* — David E Allred
(74) *Attorney, Agent, or Firm* — Greenblum & Bernstein, P.L.C.

(57) ABSTRACT

A communication unit obtains transport plan information for transport of a plurality of persons using an automobile, and a processor generates seat control information for moving, to an entrance or an exit, a seat specified from the transport plan information among a plurality of seats provided in the automobile by using the transport plan information, and outputs the seat control information to a seat movement control unit which controls movement of the plurality of seats.

14 Claims, 21 Drawing Sheets

INFORMATION PROCESSING APPARATUS, INFORMATION PROCESSING METHOD, AND COMPUTER-READABLE RECORDING MEDIUM FOR RECORDING INFORMATION PROCESSING PROGRAM

FIELD OF THE INVENTION

The present disclosure relates to an information processing apparatus which controls movement of a plurality of seats provided in a mobile body, an information processing method, and a non-transitory computer-readable recording medium for recording an information processing program.

BACKGROUND ART

Service for transporting a person by a vehicle has been conventionally proposed. For example, Japanese Unexamined Patent Publication No. 2005-38379 discloses a pick-up service support device which supports pick-up service to pick up, by a pick-up car, a care receiver who goes to a care facility to receive care service.

However, according to the above conventional technique, there may be a case where it is difficult for a person to be transported to smoothly board or get off from a vehicle, and further improvement has been therefore demanded.

SUMMARY OF THE INVENTION

The present disclosure has been made in order to solve the above-described problem, and an object of the present disclosure is to provide an information processing apparatus which enables a person to be transported to smoothly board or get off from a mobile body, an information processing method, and a non-transitory computer-readable recording medium for recording an information processing program.

An information processing apparatus according to one aspect of the present disclosure includes a processor which is configured to obtain transport plan information for transport of a plurality of persons using a mobile body, generate control information for moving, to an entrance or an exit, a seat specified by the transport plan information among a plurality of seats provided in the mobile body by using the transport plan information, and output the control information to control apparatus which controls movement of the plurality of seats.

Figure 1:
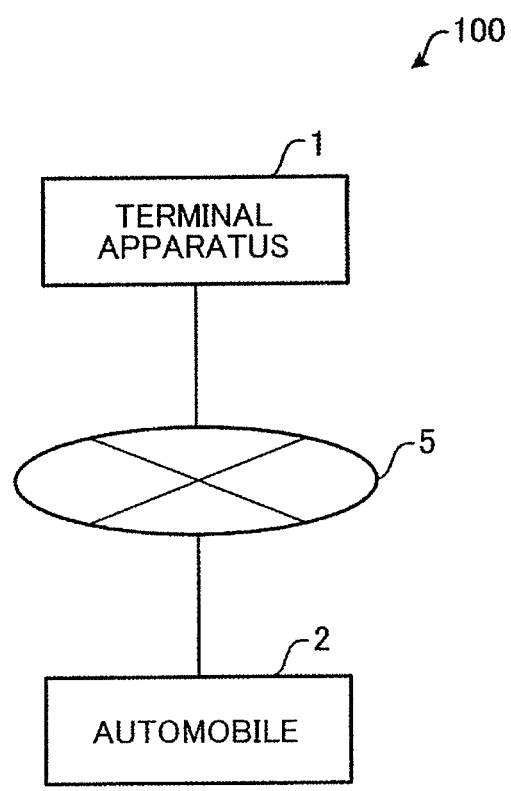
FIG. 1 is a diagram showing an overall configuration of an automobile control system according to a first embodiment of the present disclosure.

DESCRIPTION OF EMBODIMENTS (Knowledge on which the Present Disclosure is Based)

The above conventional pick-up service support device includes a data base which stores at least personal information including physical information indicative of a physical condition of each care receiver and position information of a house of each care receiver, service provider information including vehicle information related to a pick-up car for use in pick-up service and facility information related to a care facility; and reservation information indicative of a reservation condition of pick-up service, the reservation being made by a care receiver; a vehicle allocation plan creating part which determines a kind and the number of pick-up cars for use in pick-up based on the reservation information, the personal information, and the service provider information stored in the data base to allocate each care receiver who receives pick-up service to each pick-up car and to determine a pick-up route of each pick-up car; and a seat assignment determining part which determines assignment of a care receiver to a seat of each pick-up car.

The conventional pick-up service support device is configured to efficiently and appropriately create a vehicle allocation plan and conduct seat assignment of each pick-up car according to reservation conditions of the pick-up service, the reservation being made by a care receiver, without putting an excessive load on staff of a service provider which provides the pick-up service.

However, in the conventional pick-up service support device, although a care receiver is assigned to a seat in each pick-up car, and a care receiver who is to be picked up may have difficulty in smoothly getting on/off because the care receiver may be assigned to a seat positioned far from an entrance/exit.

In order to solve the above problem, an information processing apparatus according to one aspect of the present disclosure includes a processor which is configured to obtain transport plan information for transport of a plurality of persons using a mobile body; generate control information for moving, to an entrance or an exit, a seat specified by the transport plan information among a plurality of seats provided in the mobile body by using the transport plan information; and output the control information to control apparatus which controls movement of the plurality of seats.

According to the configuration, among the plurality of seats provided in the mobile body, a seat specified by the transport plan information for transport of a plurality of persons using the mobile body is moved to the entrance or the exit. Accordingly, since the seat is moved to the entrance when a person to be transported boards and the seat is moved to the exit when a person to be transported gets off, it is possible to allow the person to be transported to smoothly board or get off from the mobile body.

Additionally, in the above information processing apparatus, the transport plan information may include information indicative of a transport type, and the processor may generate the control information for moving, to the entrance or the exit, a seat specified according to the transport type among the plurality of seats.

This configuration enables a seat specified according to a transport type among the plurality of seats to be moved to the entrance or the exit. Specifically, by moving a seat according a transport mode, seat movement control can be applied to various transport modes.

Additionally, in the above information processing apparatus, the transport plan information may include information indicative of respective boarding positions of the plurality of persons to be transported, and in a case where the transport type is a first transport type in which the plurality of persons are allowed to board at the respective boarding positions, (i) the processor may determine whether or not the mobile body has arrived at the boarding position, (ii) the processor may determine an empty seat among the plurality of seats, and (iii) when determination is made that the mobile body has arrived at the boarding position, the processor may generate the control information for moving the determined empty seat to the entrance.

According to the configuration, in a case where the transport type is the first transport type in which the plurality of persons are allowed to board at the respective boarding positions, when the mobile body arrives at the boarding position, an empty seat among the plurality of seats is moved to the entrance. Therefore, it is possible to allow a person to smoothly board at a boarding position and to be seated on an empty seat at the entrance.

Additionally, in the above information processing apparatus, the transport plan information may include information indicative of the plurality of persons to be transported, respectively, the processor may be further configured to: obtain seat position information indicative of assignment of seat positions respectively to the plurality of persons to be transported; determine a person boarding at the boarding position; and determine whether or not the person determined to board has been seated on a seat, and when determination is made that the person determined to board has been seated on a seat, the processor may generate the control information for moving the seat seated by the person determined to board to a position assigned to the person determined to board according to the seat position information.

According to the configuration, when determination is made that a person having boarded has been seated on a seat, the seat is moved to a position assigned to the person having boarded according to the seat position information. Therefore, it is possible to allow a person having boarded to be seated at an assigned position without movement of the person having boarded in the vehicle.

Additionally, in the above information processing apparatus, the transport plan information may include information indicative of a get-off position of each of the plurality of persons to be transported, the processor may be further configured to: determine whether or not the mobile body has arrived at the get-off position, and when determination is made that the mobile body has arrived at the get-off position, the processor may generate the control information for moving, to the exit, at least a seat correlated with a person who gets off at the get-off position.

According to the configuration, when determination is made that the mobile body has arrived at the get-off position, at least a seat correlated with a person who gets off at the get-off position is moved to the exit. Therefore, a person to be transported is allowed to smoothly get off from a seat at the exit without moving in the vehicle.

Additionally, in the above information processing apparatus, the processor may be further configured to: obtain get-off order information indicative of a get-off order of the plurality of persons to be transported by the mobile body, in which when determination is made that the mobile body has arrived at the get-off position, the processor may generate the control information for moving, to the exit, a seat of a person who gets off at the get-off position according to the order indicated by the get-off order information.

According to the configuration, when determination is made that the mobile body has arrived at the get-off position, a seat of a person who gets off at the get-off position according to the order indicated by the get-off order information is moved to the exit. Therefore, it is possible to allow a plurality of persons to get off in a predetermined order, which satisfies a demand for get-off in order.

Additionally, in the above information processing apparatus, the transport plan information may include information indicative of each of the plurality of persons to be transported, and in a case where the transport type is a second transport type in which the plurality of persons are allowed to get off at the respective get-off positions, the processor may be further configured to: (a) determine an empty seat among the plurality of seats, (b) generate the control information for moving a determined empty seat to the entrance, (c) determine a person boarding from the entrance, (d) determine whether or not the person determined to board has been seated on the determined empty seat, and (e) when determination is made that the person determined to board has been seated, generate seating information which correlates the person determined to board with the seat being seated.

According to the configuration, in a case where the transport type is the second transport type in which the plurality of persons are allowed to get off at the respective get-off positions, an empty seat is determined among the plurality of seats and the determined empty seat is moved to the entrance. Then, a person boarding from the entrance is determined, and when determination is made that the person boarding from the entrance has been seated, the seating information is generated which correlates the person determined to board with the seat being seated.

Accordingly, by referring to the seating information which correlates a person having boarded and a seat being seated, it is possible to specify a seat seated by a person who gets off at the get-off position, thereby enabling the specified seat to be moved to the exit. Therefore, a person to get off is allowed to smoothly get off from the exit without moving in the vehicle.

Additionally, in the above information processing apparatus, the processor may be further configured to: obtain seat position information indicative of assignment of seat positions respectively to the plurality of persons to be transported, in which the processor may generate the control information for moving a seat correlated with the person determined to board to a position assigned to the person determined to board according to the seat position information.

According to the configuration, the seat position information indicative of assignment of seat positions respectively to the plurality of persons to be transported is obtained and a seat correlated with the person determined to board is moved to a position assigned according to the seat position information to the person determined to board. Therefore, a person having boarded is allowed to be seated at a position assigned to the person having boarded without moving in the vehicle.

Additionally, in the above information processing apparatus, the processor may be further configured to: obtain boarding order information indicative of a boarding order of each of the plurality of persons to be transported; and cause presentation apparatus to present the boarding order information.

According to the configuration, the boarding order information indicative of a boarding order of each of the plurality of persons to be transported is obtained and the obtained boarding order information is presented by the presentation apparatus.

Accordingly, since a plurality of persons are allowed to board according to the order indicated by the presented boarding order information, a person having boarded can be specified without determining a person to board. It is also possible to suppress a boarding miss.

Additionally, in the above information processing apparatus, the processor may be further configured to: determine whether or not the person determined to board coincides with an order indicated by the boarding order information, in which the processor may cause the presentation apparatus to present a determination result as to whether or not the person determined to board coincides with the order indicated by the boarding order information.

According to the configuration, a determination result as to whether or not a person having boarded from the entrance coincides with the order indicated by the boarding order information is presented in the presentation apparatus. Therefore, a person who views the presentation of the presentation apparatus is allowed to check whether or not a person to board is appropriate, which enables boarding of a plurality of persons in a predetermined order.

Additionally, in the above information processing apparatus, the transport plan information may include information indicative of a get-off position of each of the plurality of persons to be transported, the processor may be further configured to: determine whether or not the mobile body has arrived at the get-off position, and when determination is made that the mobile body has arrived at the get-off position, the processor may generate the control information for moving, to the exit, a seat correlated with a person who gets off at the get-off position.

According to the configuration, when determination is made that the mobile body has arrived at the get-off position, a seat correlated with a person who gets off at the get-off position is moved to the exit. Therefore, a person to get off is allowed to smoothly get off at a get-off position for the person to get off without moving in the vehicle.

Additionally, in the above information processing apparatus, the processor may obtain updated transport plan information during transport of the plurality of persons using the obtained transport plan information, and the processor may generate the control information using the updated transport plan information.

According to the configuration, even in a case where during transport of a plurality of persons, the transport plan information is updated, the control information can be generated using the updated transport plan information.

An information processing method according to another aspect of the present disclosure includes, by a computer: obtaining transport plan information for the transport of a plurality of persons using a mobile body; generating control information for moving, to an entrance or an exit, a seat specified by the transport plan information among a plurality of seats provided in the mobile body by using the transport plan information; and outputting the control information to control apparatus which controls movement of the plurality of seats.

According to the configuration, a seat specified by the transport plan information among the plurality of seats provided in the mobile body is moved to the entrance or the exit, the transport plan information being for transport of a plurality of persons using the mobile body. Accordingly, since a seat is moved to the entrance when a person to be transported boards, and the seat is moved to the exit when the person to be transported gets off, the person to be transported is allowed to smoothly board or get off from the mobile body.

A non-transitory computer-readable recording medium for recording an information processing program according to a further aspect of the present disclosure causes a computer to function to obtain transport plan information for transport of a plurality of persons using a mobile body; generate control information for moving, to an entrance or an exit, a seat specified by the transport plan information among a plurality of seats provided in the mobile body by using the transport plan information; and output the control information to control apparatus which controls movement of the plurality of seats.

According to the configuration, a seat specified by the transport plan information among the plurality of seats provided in the mobile body is moved to the entrance or the exit, the transport plan information being for transport of a plurality of persons using the mobile body. Accordingly, since a seat is moved to the entrance when a person to be transported boards, and the seat is moved to the exit when the person to be transported gets off, the person to be transported is allowed to smoothly board or get off from the mobile body.

Embodiments of the present disclosure will be described with reference to the accompanying drawings in the following. The embodiments below are examples implementing the present disclosure and do not limit a technical range of the present disclosure.

First Embodiment

FIG. 1 is a diagram showing an overall configuration of an automobile control system according to a first embodiment of the present disclosure.

An automobile control system 100 shown in FIG. 1 includes a terminal apparatus 1 and an automobile 2. The terminal apparatus 1 is communicably connected to the automobile 2 via a network 5. The network 5 is, for example, the Internet.

The terminal apparatus 1, which is, for example, a personal computer, a smart phone, or a tablet computer, creates a transport plan for transporting a plurality of subjects by the automobile 2.

The automobile 2, which is one example of a mobile body, transports a plurality of subjects according to a transport plan created by the terminal apparatus 1. For example, in transport service to transport a plurality of care receivers from their houses to a care facility, the automobile 2 goes to the respective houses of the plurality of care receivers to pick them up and allows the plurality of care receivers to board, and then allows the plurality of care receivers to get off at the care facility. The series of action is considered to be "pick-up". In transport service to transport a plurality of care receivers from a care facility to their houses, the automobile 2 allows the plurality of care receivers to board at the care facility and allows the plurality of care receivers to get off at their houses. The series of action is considered to be "sending". In this case, the terminal apparatus 1 is used by, for example, care facility staff, a care assistant, or an operator.

Although the automobile 2 in the first embodiment is an automatic operation vehicle which is not driven by a person, the present disclosure is not particularly limited thereto and the automobile 2 may be driven by a person.

Figure 2:
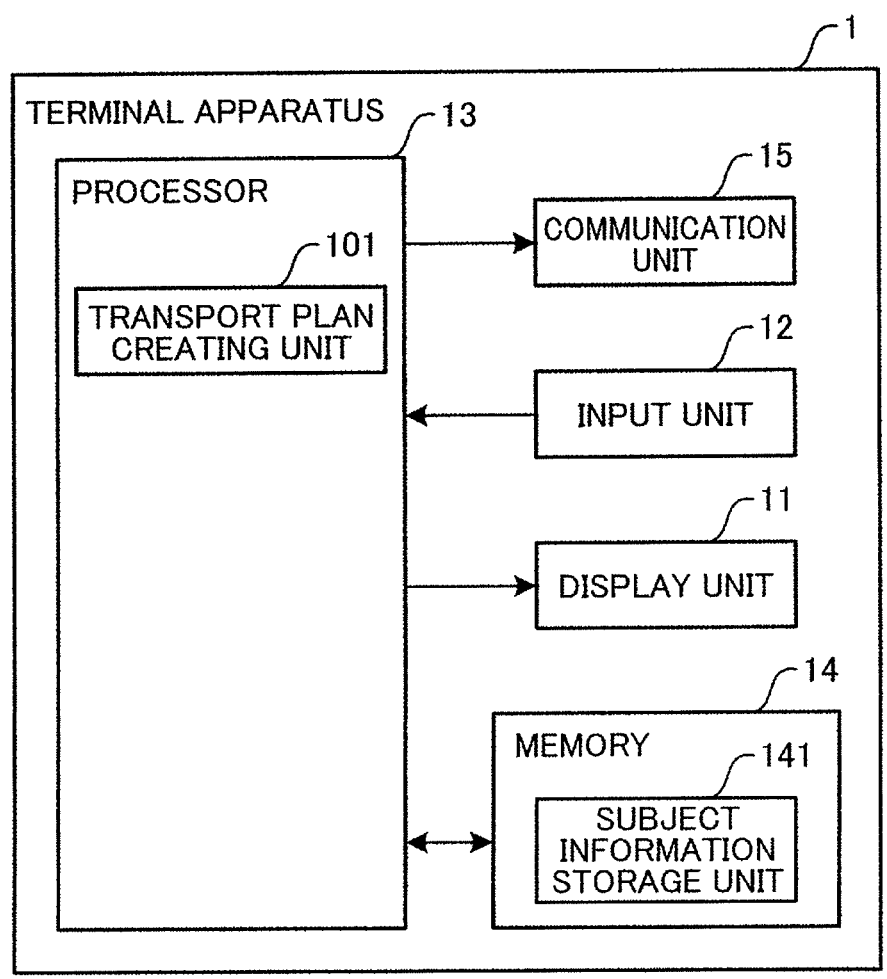
FIG. 2 is a block diagram showing a configuration of a terminal apparatus according to the first embodiment of the present disclosure.

FIG. 2 is a block diagram showing a configuration of the terminal apparatus according to the first embodiment of the present disclosure.

The terminal apparatus 1 shown in FIG. 2 includes a display unit 11, an input unit 12, a processor 13, a memory 14, and a communication unit 15.

The display unit 11 displays various kinds of information. The display unit 11 displays an input screen for accepting input, by an operator, of information related to a plurality of subjects to be transported using the automobile 2.

The information related to a plurality of subjects includes, for example, information indicative of a transport type, identification information for identifying a subject, boarding position information, transport destination information, transport source information, and get-off position information. Transport type includes a first transport type of allowing a plurality of subjects board at their boarding positions and a second transport type of allowing the plurality of subjects get off at their get-off positions. The information indicative of a transport type indicates whether transport using the automobile 2 is of the first transport type or of the second transport type.

In the first transport type, the automobile 2 goes to pick up a plurality of subjects at their houses as boarding positions and allows the plurality of subjects to get off at a care facility as a transport destination. In the second transport type, the automobile 2 allows a plurality of subjects to board at a care facility as a transport source and sends the plurality of subjects to the respective houses as get-off positions.

The identification information is an identification number, a name or similar information which can specify a subject. The boarding position information indicates the respective boarding positions of the plurality of subjects in the first transport type, for example, the respective houses of the plurality of subjects. The transport destination information indicates the respective transport destinations of the plurality of subjects in the first transport type, the respective transport destinations being places at which the plurality of subjects are allowed to get off after boarding the automobile 2 at the respective houses. The transport source information indicates transport sources of the plurality of subjects in the second transport type, the transport sources being addresses of places at which the plurality of subjects are allowed to board the automobile 2. The get-off position information indicates the respective get-off positions of the plurality of subjects in the second transport type, the get-off positions being, for example, addresses of the respective houses of the plurality of subjects. The boarding position and the get-off position may be the same place or may be different places. The transport destination and the transport source may be the same place or different places.

The input unit 12 is, for example, a mouse, a key board or a touch panel, and accepts input, by an operator, of information related to a plurality of subjects to be transported using the automobile 2. The operator inputs the information related to the plurality of subjects to the input screen displayed in the display unit 11.

The processor 13 includes a transport plan creating unit 101. The transport plan creating unit 101 creates transport plan information for the transport of the plurality of subjects by using the automobile 2. The transport plan creating unit 101 creates transport plan information based on the information related to the plurality of subjects.

In a case where a transport type is the first transport type, the transport plan information includes information indicative of a transport type, identification information about a plurality of subjects, boarding position information of the plurality of subjects, transport destination information of the plurality of subjects, and transport route information. In a case where the transport type is the second transport type, the transport plan information includes the information indicative of a transport type, the identification information of the plurality of subjects, the transport source information of the plurality of subjects, the get-off position information of the plurality of subjects, and the transport route information.

For example, in a case where the transport type is the first transport type, the transport route information indicates a route of the shortest time or the shortest distance for the automobile 2 to go from the current position to drop by boarding positions of the plurality of subjects and arrive at a transport destination. For example, in a case where the transport type is the second transport type, the transport route information indicates a route of the shortest time or the shortest distance for the automobile 2 to move from the current position to a transport source and go from the transport source to drop by get-off positions of the plurality of subjects. The current position of the automobile 2 may be a predetermined place or may be obtained from the automobile 2. The current position of the automobile 2 may be a transport destination or a transport source. The transport route information is not limited to a route of the shortest time or the shortest distance.

The transport plan creating unit 101 creates transport route information based on the information indicative of a transport type, the boarding position information of the plurality of subjects, and the transport destination information of the plurality of subjects. The transport plan creating unit 101 also creates transport route information based on the information indicative of a transport type, the transport source information of the plurality of subjects, and the get-off position information of the plurality of subjects.

The memory 14 is, for example, a semiconductor memory, and includes a subject information storage unit 141. The subject information storage unit 141 stores information related to a plurality of subjects registered in advance. Specifically, the subject information storage unit 141 stores in advance identification information, boarding position information, transport destination information, transport source information, and get-off position information of a subject so as to be correlated with each other.

The input unit 12 may not necessarily accept all the inputs of information related to a plurality of subjects but may accept only the inputs of information indicative of a transport type and identification information of the plurality of subjects among information related to the plurality of subjects. In this case, the transport plan creating unit 101 may read boarding position information, transport destination information, transport source information, and get-off position information which are correlated with the input identification information of the plurality of subjects from the subject information storage unit 141.

The communication unit 15 transmits various kinds of information to the automobile 2 and also receives various kinds of information from the automobile 2. The communication unit 15 transmits transport plan information created by the transport plan creating unit 101 to the automobile 2.

Figure 3:
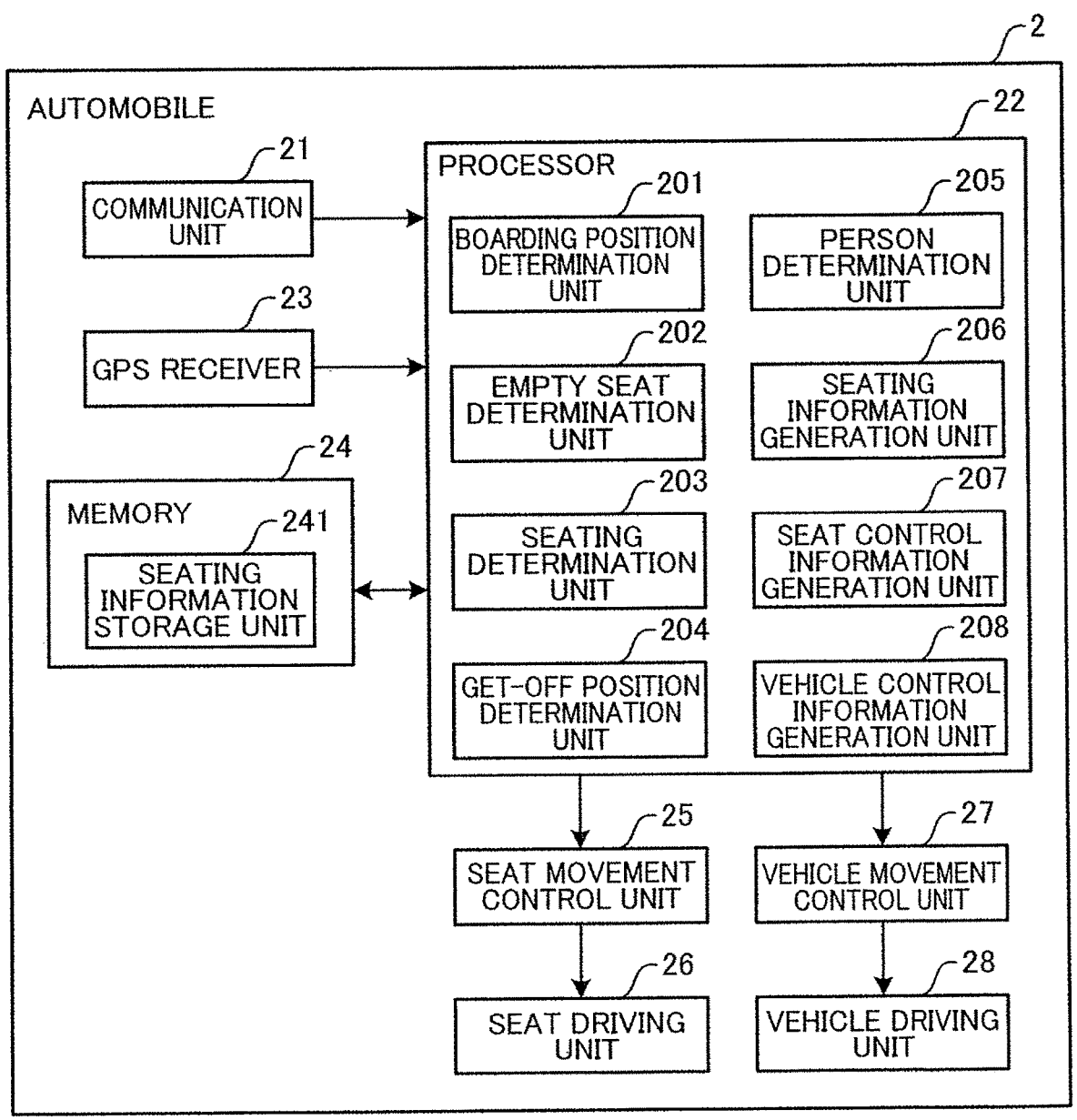
FIG. 3 is a block diagram showing a configuration of an automobile according to the first embodiment of the present disclosure.

FIG. 3 is a block diagram showing a configuration of an automobile according to the first embodiment of the present disclosure.

The automobile 2 shown in FIG. 3 includes the communication unit 21, a processor 22, a global positioning system (GPS) receiver 23, a memory 24, a seat movement control unit 25, a seat driving unit 26, a vehicle movement control unit 27, and a vehicle driving unit 28.

The communication unit 21 transmits various kinds of information to the terminal apparatus 1 and also receives various kinds of information from the terminal apparatus 1. The communication unit 21 obtains transport plan information for transport of a plurality of persons using the automobile 2. The communication unit 21 receives transport plan information transmitted by the terminal apparatus 1.

The processor 22 includes a boarding position determination unit 201, an empty seat determination unit 202, a seating determination unit 203, a get-off position determination unit 204, a person determination unit 205, a seating information generation unit 206, a seat control information generation unit 207, and a vehicle control information generation unit 208.

The GPS receiver 23 obtains a current position of the automobile 2. The current position is represented by latitude and longitude.

The memory 24 is, for example, semiconductor memory, and includes a seating information storage unit 241.

In a case where the transport type is the first transport type in which the plurality of subjects are allowed to board at the respective boarding positions, the boarding position determination unit 201 determines whether or not the automobile 2 has arrived at the boarding position. In a case where the current position of the automobile 2 obtained by the GPS receiver 23 coincides with a boarding position included in the transport plan information, the boarding position determination unit 201 determines that the automobile 2 has arrived at the boarding position.

When determination is made that the automobile 2 has arrived at the boarding position, the empty seat determination unit 202 determines an empty seat among the plurality of seats. The empty seat determination unit 202 may determine an empty seat among the plurality of seats by a weight sensor provided on a seat. Alternatively, a button to be pressed when a subject is seated may be provided on a seat. In this case, the empty seat determination unit 202 may determine that a subject is seated at a seat having a button pressed and determine that a seat with a button not pressed is an empty seat. Further, in a case where no person is in the automobile 2, all the seats are empty seats. Therefore, the empty seat determination unit 202 may determine, at a first boarding position, that a seat at the entrance is an empty seat and store information that a person has been seated on the seat, and at a subsequent boarding position, may determine that a seat not being seated is an empty seat. In a case where an order of seats to be moved to the entrance is fixed, the empty seat determination unit 202 may determine that a seat to be moved to the entrance next is an empty seat.

In a case where the transport type is the second transport type in which the plurality of subjects are allowed to get off at the respective get-off positions, the empty seat determination unit 202 determines an empty seat among the plurality of seats when the plurality of subjects are allowed to board.

The seating determination unit 203 determines whether or not a subject boarding from the entrance has been seated on an empty seat. The seating determination unit 203 may determine that a subject has been seated on an empty seat by the weight sensor provided on the seat. Also, a button pressed when a subject is seated may be provided on a seat, and in such a case, when the button is pressed, the seating determination unit 203 may determine that the subject has been seated on an empty seat.

The get-off position determination unit 204 determines whether or not the automobile 2 has arrived at a get-off position. In a case where the current position of the automobile 2 obtained by the GPS receiver 23 coincides with a get-off position included in the transport plan information, the get-off position determination unit 204 determines that the automobile 2 has arrived at the get-off position.

The person determination unit 205 determines a subject who boards from the entrance at a boarding position. For example, with a camera arranged at the entrance, the person determination unit 205 may determine a subject boarding from the entrance by authenticating a face of the boarding subject photographed by the camera. The person determination unit 205 may also determine a subject boarding from the entrance by, for example, biometric authentication such as fingerprint authentication or iris authentication. The transport plan information includes a face image of a subject for use in face authentication or biometric information of a subject for use in biometric authentication.

In a case where the seating determination unit 203 determines that a boarding subject has been seated, the seating information generation unit 206 generates seating information which correlates the subject determined by the person determination unit 205 with the seat being seated. The seating information generation unit 206 stores the generated seating information in the seating information storage unit 241.

The seating information storage unit 241 stores seating information which correlates a subject boarding the automobile 2 with a seat seated by the subject.

The seat control information generation unit 207 generates seat control information (control information) for moving, to the entrance or the exit, a seat specified by transport plan information among the plurality of seats provided in the automobile 2. A seat specified herein from the transport plan information is, as one example, an empty seat on which a subject to board at subsequent pick-up will be seated, a seat correlated with a subject to get off at sending, and the like. The seat control information generation unit 207 outputs the seat control information to the seat movement control unit 25 (control apparatus) which controls movement of the plurality of seats. The seat control information generation unit 207 generates seat control information for moving a seat specified according to a transport type among the plurality of seats to the entrance or the exit.

The seat control information generation unit 207 generates seat control information for moving an empty seat determined by the empty seat determination unit 202 to the entrance.

In a case where the get-off position determination unit 204 determines that the automobile 2 has arrived at a get-off position, the seat control information generation unit 207 generates seat control information for moving a seat correlated with a subject who gets off at the get-off position to the exit.

The seat movement control unit 25 controls movement of the plurality of seats based on the seat control information output from the seat control information generation unit 207.

The seat driving unit 26 causes the plurality of seats to move according to control by the seat movement control unit 25.

The vehicle control information generation unit 208 generates vehicle control information for moving the automobile 2 according to the transport route information included in the transport plan information. The vehicle control information generation unit 208 outputs the generated vehicle control information to the vehicle movement control unit 27.

The vehicle movement control unit 27 controls the vehicle driving unit 28 to start moving of the automobile 2 when receiving the vehicle control information for moving the automobile 2 from the vehicle control information generation unit 208.

The vehicle driving unit 28 causes the automobile 2 to move according to control by the vehicle movement control unit 27. In a case where the automobile 2 is an engine vehicle, the vehicle driving unit 28 is, for example, an engine and a transmission. In a case where the automobile 2 is an electric automobile (battery vehicle), the vehicle driving unit 28 is, for example, a travel motor and a transmission. These engine and travel motor are both started and stopped via an ignition switch.

Figure 4:
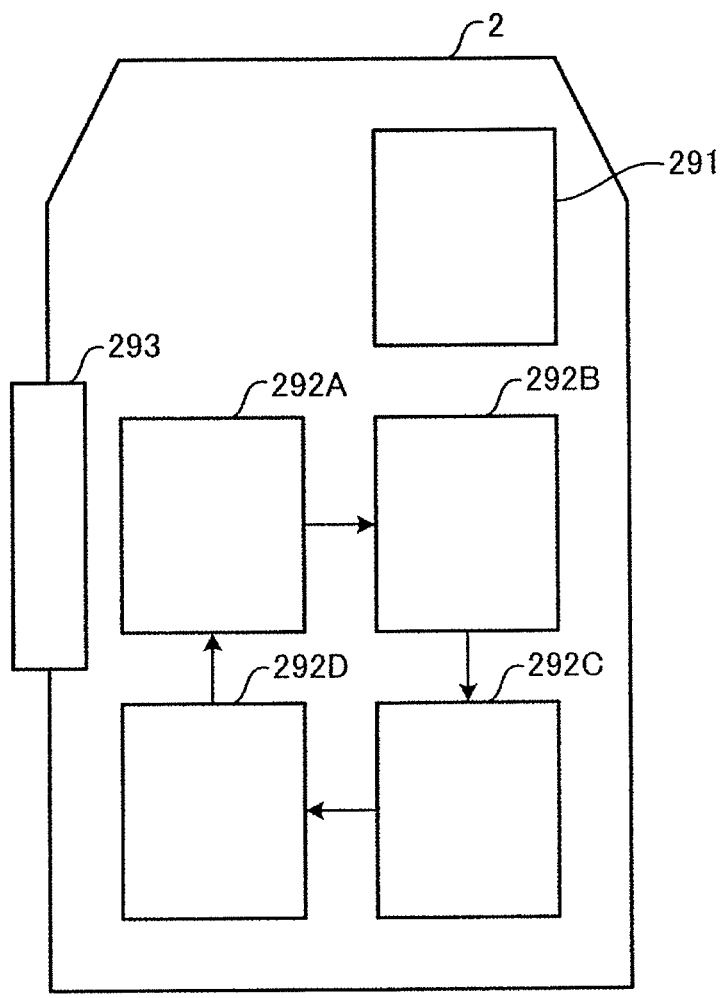
FIG. 4 is a view for describing movement of seats of the automobile according to the first embodiment of the present disclosure.

FIG. 4 is a view for describing movement of seats of the automobile according to the first embodiment of the present disclosure. FIG. 4 is a view of a boarding space inside the automobile 2 seen from above.

Since the automobile 2 in the first embodiment is an automatic operation vehicle, no driver is present on the seat 291 on the front side. When the automobile 2 is driven by a person, a driver is seated on the seat 291. In a case where a subject is a care receiver, a care assistant may be seated on the seat 291.

A subject boards and also gets off from the vehicle through an entrance/exit 293. Although the entrance and the exit are the same in FIG. 4, the entrance and the exit may be provided separately.

The automobile 2 shown in FIG. 4 includes four seats 292A, 292B, 292C, and 292D. The seats 292A, 292B, 292C, and 292D move clockwise in a direction indicated by arrows. The movement directions of the seats 292A, 292B, 292C, and 292D are not limited to the above and may be counterclockwise. The positions of the seats 292A, 292B, 292C, and 292D may be determined in advance. For example, in a case of causing a subject to seat on the seat 292D, the seat 292D may be moved forward to so that a subject boarding from the entrance 293 is seated on the seat 292D, and then the seat 292D may be moved rearward to return the seat 292D to an original position. Positions of the seats 292A, 292B, 292C, and 292D may not be determined in particular.

Subsequently, operation of the terminal apparatus 1 according to the first embodiment of the present disclosure will be described.

Figure 5:
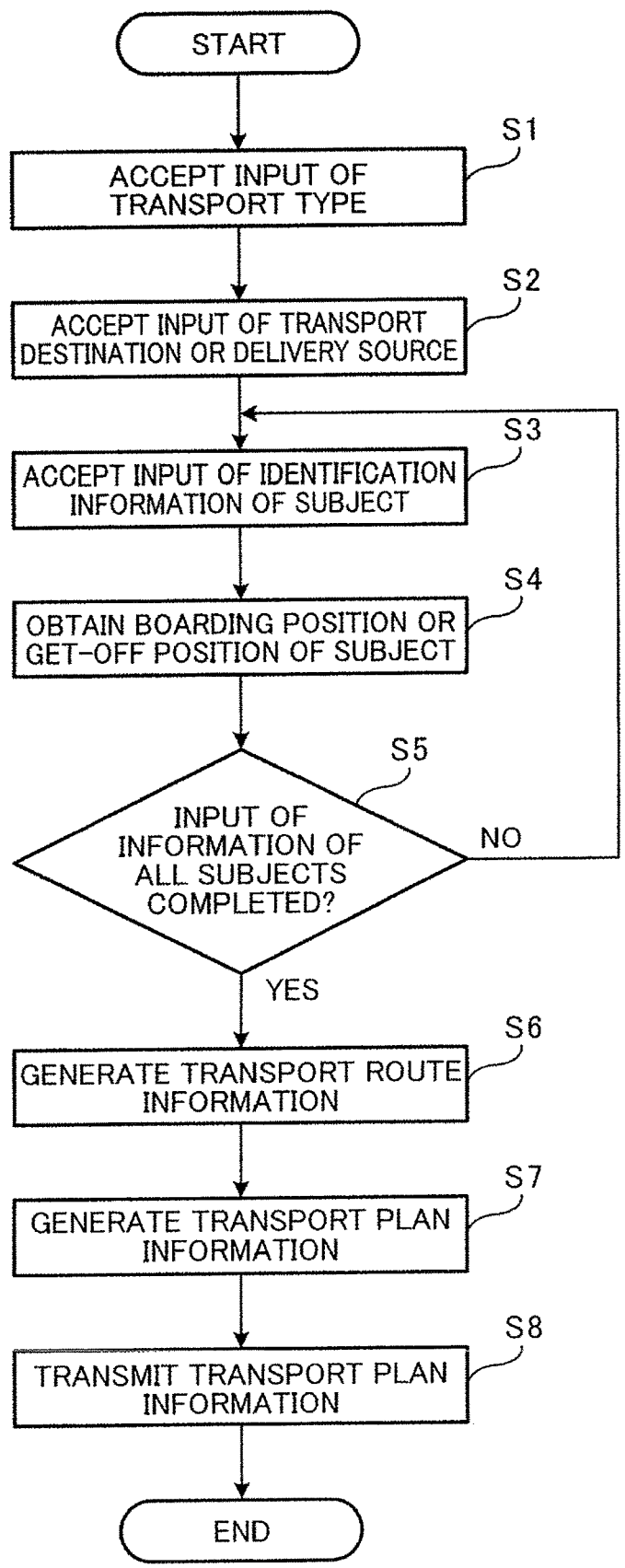
FIG. 5 is a flow chart for describing operation of the terminal apparatus according to the first embodiment of the present disclosure.

FIG. 5 is a flow chart for describing operation of the terminal apparatus according to the first embodiment of the present disclosure.

First, in step S1, the input unit 12 accepts input of a transport type by an operator. The input unit 12 accepts input of either the first transport type in which a plurality of subjects are allowed to board at the respective boarding positions or the second transport type in which the plurality of subjects are allowed to get off at the respective get-off positions.

Next, in step S2, the input unit 12 accepts input of a transport destination or a transport source of the plurality of subjects. When the transport type is the first transport type, the input unit 12 accepts input of a transport destination of the plurality of subjects. When the transport type is the second transport type, the input unit 12 accepts input of a transport source of the plurality of subjects. When a transport destination or a transport source is determined in advance, the processing of step S2 may be omitted.

Next, in step S3, the input unit 12 accepts input of identification information of a subject. The identification information of a subject is, for example, a name of the subject.

Next, in step S4, the transport plan creating unit 101 obtains, from the subject information storage unit 141, a boarding position or a get-off position corresponding to the identification information of the subject input by the input unit 12. When the transport type is the first transport type, the transport plan creating unit 101 obtains a boarding position corresponding to the identification information of the subject input by the input unit 12 from the subject information storage unit 141. When the transport type is the second transport type, the transport plan creating unit 101 obtains a get-off position corresponding to the identification information of the subject input by the input unit 12 from the subject information storage unit 141.

Next, in step S5, the transport plan creating unit 101 determines whether or not input of information of all the subjects are completed. Here, when determination is made that input of the information of all the subjects are yet to be completed (NO in step S5), the processing returns to step S3.

On the other hand, when determination is made that input of the information of all the subjects are completed (YES in step S5), the transport plan creating unit 101 generates transport route information for transporting the plurality of subjects in step S6. When the transport type is the first transport type, the transport plan creating unit 101 generates information about a transport route of the shortest time or the shortest distance for the automobile 2 to go from the current position to drop by boarding positions of the plurality of subjects and arrive at a transport destination. When the transport type is the second transport type, the transport plan creating unit 101 generates information about a transport route of the shortest time or the shortest distance for the automobile 2 to move from the current position to a transport source and go from the transport source to drop by get-off positions of the plurality of subjects.

Next, in step S7, the transport plan creating unit 101 creates transport plan information. When the transport type is the first transport type, the transport plan creating unit 101 creates transport plan information including a transport type, a transport destination, the identification information of the plurality of subjects, and a boarding position of the plurality of subjects input by the input unit 12, and the generated transport route information. When the transport type is the second transport type, the transport plan creating unit 101 creates transport plan information including a transport type, a transport source, the identification information of the plurality of subjects, and a get-off position of the plurality of subjects input by the input unit 12, and the generated transport route information.

Next, in step S8, the communication unit 15 transmits the transport plan information created by the transport plan creating unit 101 to the automobile 2.

Subsequently, description will be made of operation of the automobile 2 according to the first embodiment of the present disclosure.

Figure 6:
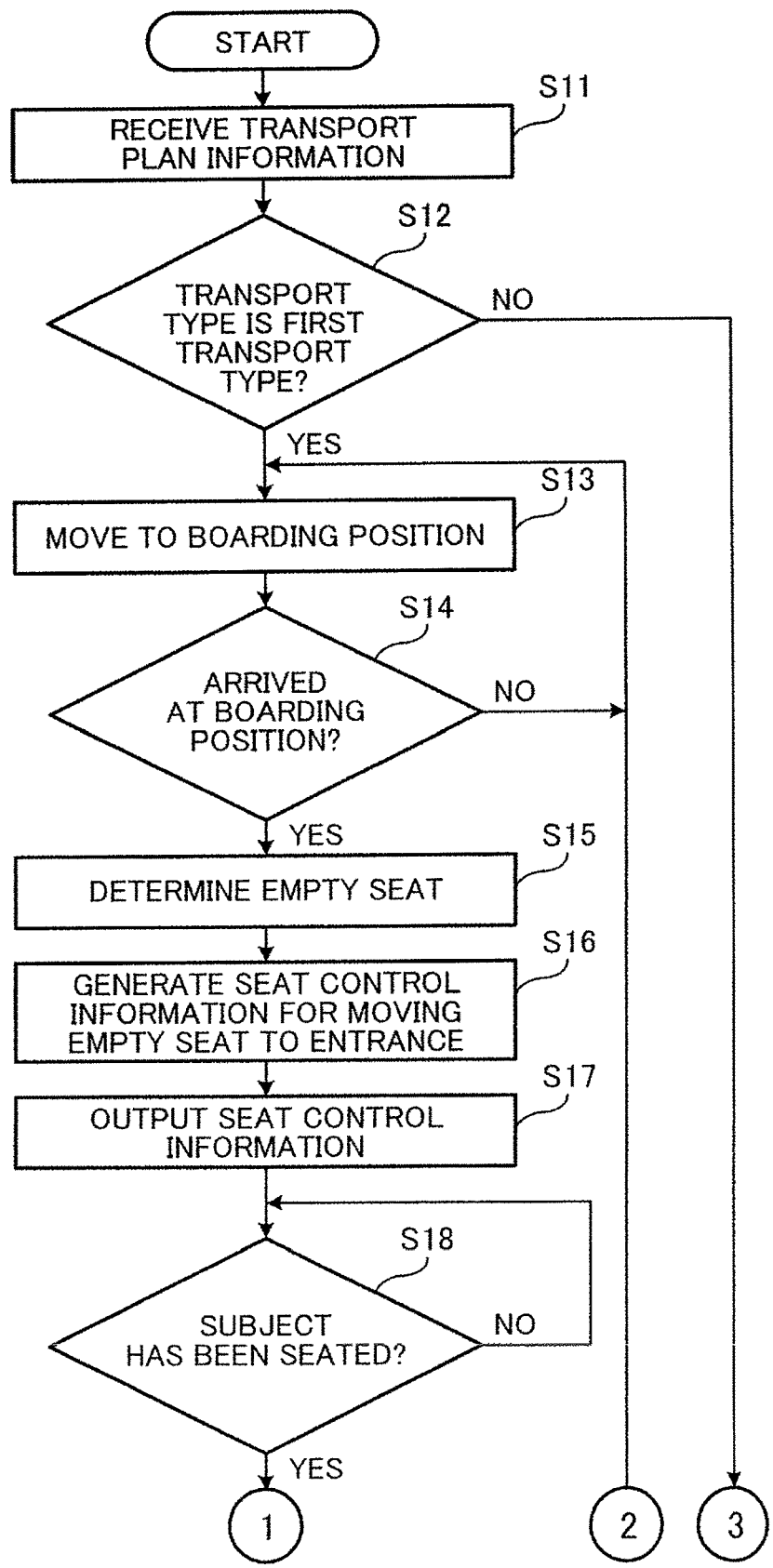
FIG. 6 is a first flow chart for describing operation of the automobile according to the first embodiment of the present disclosure.
Figure 7:
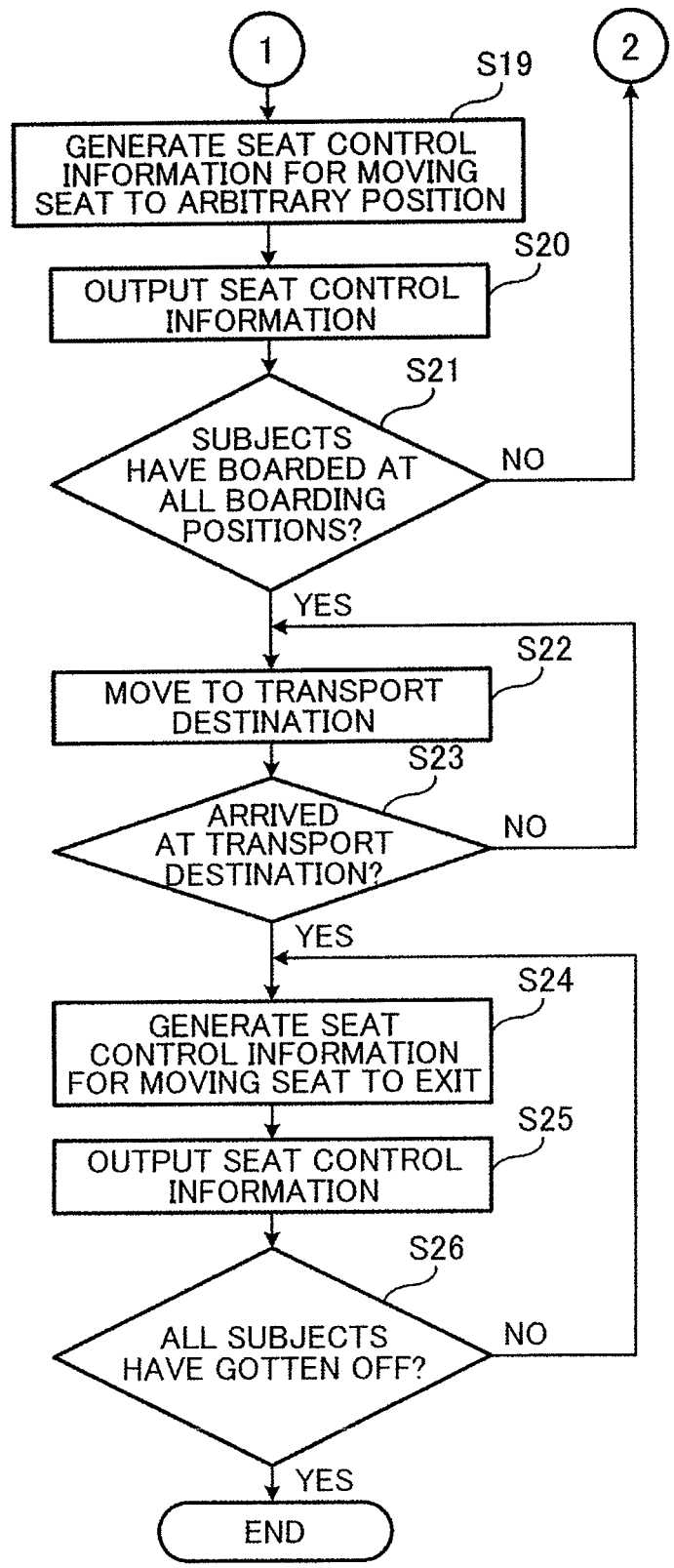
FIG. 7 is a second flow chart for describing operation of the automobile according to the first embodiment of the present disclosure.
Figure 8:
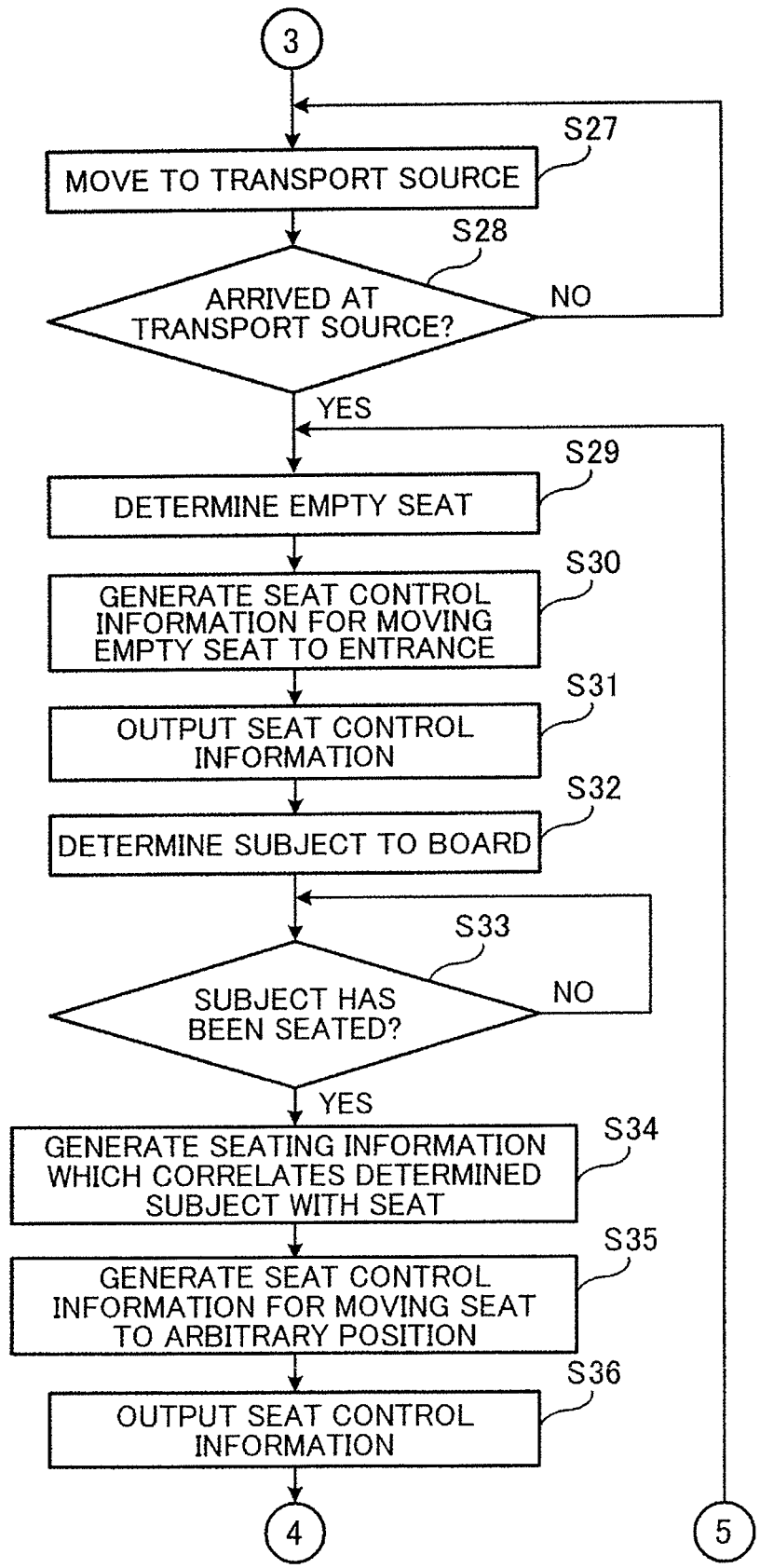
FIG. 8 is a third flow chart for describing operation of the automobile according to the first embodiment of the present disclosure.
Figure 9:
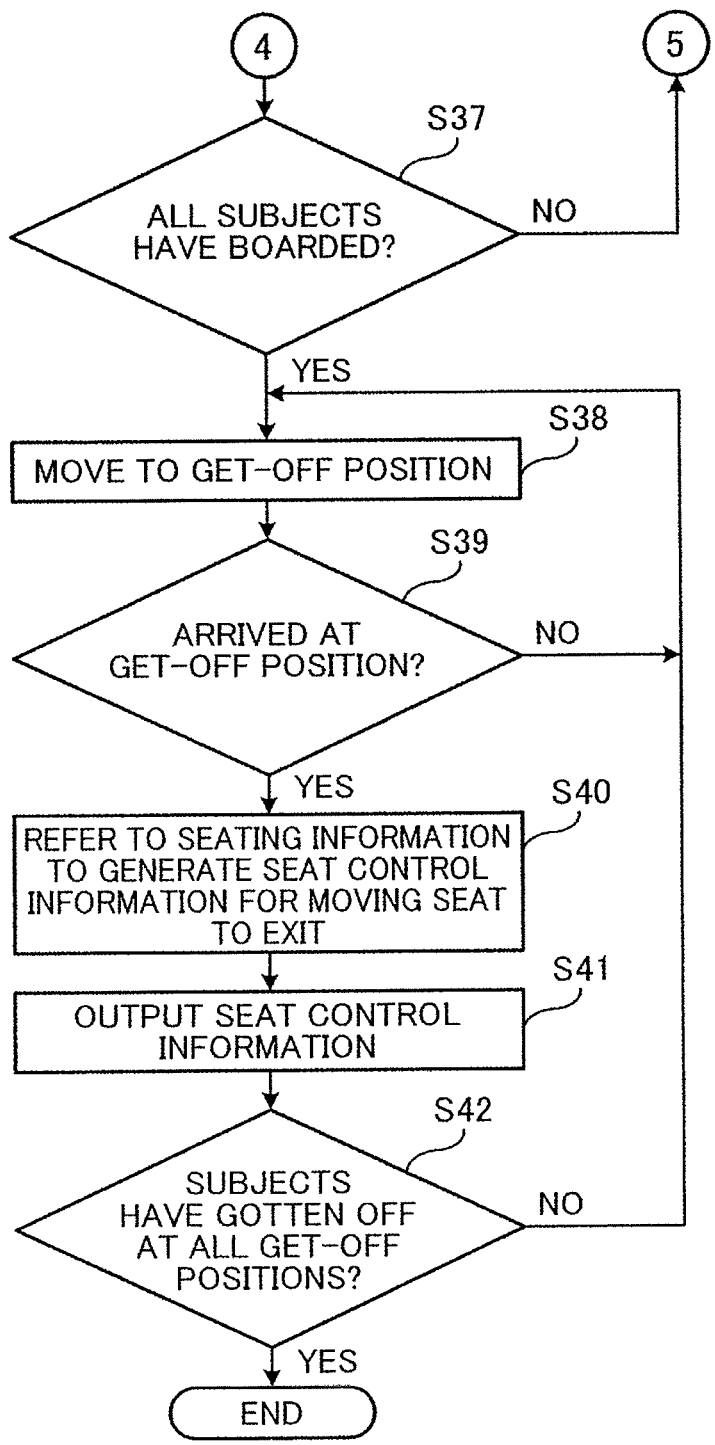
FIG. 9 is a fourth flow chart for describing operation of the automobile according to the first embodiment of the present disclosure.

FIG. 6 is a first flow chart for describing operation of the automobile according to the first embodiment of the present disclosure, FIG. 7 is a second flow chart for describing operation of the automobile according to the first embodiment of the present disclosure, FIG. 8 is a third flow chart for describing operation of the automobile according to the first embodiment of the present disclosure, and FIG. 9 is a fourth flow chart for describing operation of the automobile according to the first embodiment of the present disclosure.

First, in step S11, the communication unit 21 receives the transport plan information transmitted by the terminal apparatus 1.

Next, in step S12, the vehicle control information generation unit 208 determines whether or not the transport type included in the transport plan information received by the communication unit 21 is the first transport type.

Here, in a case where the transport type is determined to be the first transport type (YES in step S12), the vehicle movement control unit 27 causes the automobile 2 to move to one boarding position among a plurality of boarding positions in step S13. The vehicle control information generation unit 208 generates vehicle control information for moving the automobile 2 to the one boarding position of the plurality of boarding positions according to the transport route information included in the transport plan information and outputs the generated vehicle control information to the vehicle movement control unit 27. The vehicle movement control unit 27 controls the vehicle driving unit 28 according to the vehicle control information generated by the vehicle control information generation unit 208 to cause the automobile 2 to move to the boarding position.

Next, in step S14, the boarding position determination unit 201 determines whether or not the automobile 2 has arrived at the boarding position. At this time, the GPS receiver 23 obtains a current position of the automobile 2. The boarding position determination unit 201 determines whether or not the current position of the automobile 2 obtained by the GPS receiver 23 coincides with the boarding position. When determining that the current position of the automobile 2 obtained by the GPS receiver 23 coincides with the boarding position, the boarding position determination unit 201 determines that the automobile 2 has arrived at the boarding position. Also, when determining that the current position of the automobile 2 obtained by the GPS receiver 23 does not coincide with the boarding position, the boarding position determination unit 201 determines that the automobile 2 has not yet arrived at the boarding positions.

Although in the first embodiment, the boarding position determination unit 201 determines whether a current position of the automobile 2 obtained by the GPS receiver 23 coincides with a boarding position or not, the present disclosure is not particularly limited thereto. The automobile 2 may include an input unit which accepts input, made by a staff, of arrival at a boarding position, so that upon input of the arrival at the boarding position through the input unit, the boarding position determination unit 201 may determine that the automobile 2 has arrived at the boarding position.

Here, when determination is made that the automobile 2 has not yet arrived at the boarding position (NO in step S14), the processing returns to step S13.

On the other hand, when determination is made that the automobile 2 has arrived at the boarding position (YES in step S14), the empty seat determination unit 202 determines an empty seat among the plurality of seats provided in the automobile 2 in step S15.

Next, in step S16, the seat control information generation unit 207 generates seat control information for moving an empty seat determined by the empty seat determination unit 202 to the entrance. In a case where a plurality of empty seats are present, the seat control information generation unit 207 selects an empty seat closest to the entrance and generates seat control information for moving the selected empty seat to the entrance. Also in a case where a plurality of empty seats are present, the seat control information generation unit 207 can select an arbitrary empty seat.

Next, in step S17, the seat control information generation unit 207 outputs the generated seat control information to the seat movement control unit 25. The seat movement control unit 25 controls the seat driving unit 26 according to the seat control information generated by the seat control information generation unit 207 to move the empty seat to the entrance.

Next, in step S18, the seating determination unit 203 determines whether or not the subject boarding from the entrance has been seated on the empty seat. Here, when determination is made that the subject has not been seated on the empty seat (NO in step S18), the determination of step S18 will be repeated until the subject is seated on the empty seat.

On the other hand, when determination is made that the subject has been seated on the empty seat (YES in step S18), the seat control information generation unit 207 generates seat control information for moving the seat seated by the subject to an arbitrary position in step S19. The seat on which the subject has been seated may not necessarily be moved. In a case of not moving the seat seated by the subject, the processing of step S19 and step S20 is omitted.

Next, in step S20, the seat control information generation unit 207 outputs the generated seat control information to the seat movement control unit 25. The seat movement control unit 25 controls the seat driving unit 26 according to the seat control information generated by the seat control information generation unit 207 to move the seat seated by the subject to an arbitrary position.

Next, in step S21, the seat control information generation unit 207 determines whether or not subjects have boarded at all the boarding positions included in the transport plan information. Here, when determination is made that the subjects have not boarded at all the boarding positions (NO in step S21), the processing returns to step S13, so that the automobile 2 moves to the next boarding position.

On the other hand, when determination is made that the subjects have boarded at all the boarding positions (YES in step S21), the vehicle movement control unit 27 causes the automobile 2 to move to a transport destination of the plurality of subjects in step S22. The vehicle control information generation unit 208 generates vehicle control information for moving the automobile 2 to the transport destination of the plurality of subjects according to the transport route information included in the transport plan information and outputs the generated vehicle control information to the vehicle movement control unit 27. The vehicle movement control unit 27 controls the vehicle driving unit 28 according to the vehicle control information generated by the vehicle control information generation unit 208 to cause the automobile 2 to move to the transport destination.

Next, in step S23, the get-off position determination unit 204 determines whether or not the automobile 2 has arrived at the transport destination (get-off position). At this time, the GPS receiver 23 obtains a current position of the automobile 2. The get-off position determination unit 204 determines whether or not the current position of the automobile 2 obtained by the GPS receiver 23 coincides with the transport destination. When determining that the current position of the automobile 2 obtained by the GPS receiver 23 coincides with the transport destination, the get-off position determination unit 204 determines that the automobile 2 has arrived at the transport destination. When determining that the current position of the automobile 2 obtained by the GPS receiver 23 does not coincide with the transport destination, the get-off position determination unit 204 determines that the automobile 2 has not yet arrived at the transport destination.

Although in the first embodiment, the get-off position determination unit 204 determines whether or not a current position of the automobile 2 obtained by the GPS receiver 23 coincides with a transport destination, the present disclosure is not particularly limited thereto. The automobile 2 may include an input unit which accepts input, made by a staff, of arrival at a transport destination, so that upon input of the arrival at the transport destination through the input unit, the get-off position determination unit 204 may determine that the automobile 2 has arrived at the transport destination.

Here, when determination is made that the automobile 2 has not yet arrived at the transport destination (NO in step S23), the processing returns to step S22.

On the other hand, when determination is made that the automobile 2 has arrived at the transport destination (YES in step S23), the seat control information generation unit 207 generates seat control information for moving a seat correlated with a subject who gets off at the transport destination to the exit in step S24. In the first embodiment, since all of the plurality of subjects get off at one transport destination, the respective seats on which the plurality of subjects are seated will be sequentially moved to the exit. At this time, the seats will be moved in an arbitrary order. The seats may be moved starting at a seat closest to the exit.

Next, in step S25, the seat control information generation unit 207 outputs the generated seat control information to the seat movement control unit 25. The seat movement control unit 25 controls the seat driving unit 26 according to the seat control information generated by the seat control information generation unit 207 to move a seat seated by a subject to the exit.

Next, in step S26, the seat control information generation unit 207 determines whether or not all the subjects have gotten off. Here, when determination is made that not all the subjects have gotten off (NO in step S26), the processing returns to step S24.

On the other hand, when determination is made that all the subjects have gotten off (YES in step S26), the processing ends.

Although in the first embodiment, all of the plurality of subjects get off at one transport destination, the present disclosure is not particularly limited thereto, and each of the plurality of subjects may get off at a different transport destination. In this case, in place of the processing in step S26 in FIG. 7, the seat control information generation unit 207 may determine whether or not a subject has gotten off at each of all the transport destinations included in the transport plan information. Here, when determination is made that the subjects have not gotten off at all the transport destinations, the processing returns to step S22 and the automobile 2 may move to the next transport destination. On the other hand, when determination is made that the subjects have gotten off at all the transport destinations, the processing may end.

When determination is made that the transport type is not the first transport type in step S12 in FIG. 6, i.e., that the transport type is the second transport type (NO in step S12), the vehicle movement control unit 27 causes the automobile 2 to move to the transport sources as boarding positions of the plurality of subjects in step S27. The vehicle control information generation unit 208 generates vehicle control information for moving the automobile 2 to a transport source according to the transport route information included in the transport plan information and outputs the generated vehicle control information to the vehicle movement control unit 27. The vehicle movement control unit 27 controls the vehicle driving unit 28 according to the vehicle control information generated by the vehicle control information generation unit 208 to move the automobile 2 to the transport source.

Next, in step S28, the boarding position determination unit 201 determines whether the automobile 2 has arrived at the transport source or not. At this time, the GPS receiver 23 obtains a current position of the automobile 2. The boarding position determination unit 201 determines whether or not the current position of the automobile 2 obtained by the GPS receiver 23 coincides with the transport source. When determining that the current position of the automobile 2 obtained by the GPS receiver 23 coincides with the transport source, the boarding position determination unit 201 determines that the automobile 2 has arrived at the transport source. When determining that the current position of the automobile 2 obtained by the GPS receiver 23 does not coincide with the transport source, the boarding position determination unit 201 determines that the automobile 2 has not arrived at the transport source.

Here, when determination is made that the automobile 2 has not yet arrived at the transport source (NO in step S28), the processing returns to step S27.

On the other hand, when determination is made that the automobile 2 has arrived at the transport source (YES in step S28), the empty seat determination unit 202 determines an empty seat among the plurality of seats provided in the automobile 2 in step S29.

Next, in step S30, the seat control information generation unit 207 generates seat control information for moving an empty seat determined by the empty seat determination unit 202 to the entrance. In a case where a plurality of empty seats are present, the seat control information generation unit 207 selects an empty seat closest to the entrance and generates seat control information for moving the selected empty seat to the entrance. Also in a case where a plurality of empty seats are present, the seat control information generation unit 207 may select an arbitrary empty seat.

Next, in step S31, the seat control information generation unit 207 outputs the generated seat control information to the seat movement control unit 25. The seat movement control unit 25 controls the seat driving unit 26 according to the seat control information generated by the seat control information generation unit 207 to move the empty seat to the entrance.

Next, in step S32, the person determination unit 205 determines a subject boarding from the entrance. The person determination unit 205 specifies which subject included in the transport plan information corresponds to the subject boarding from the entrance.

Next, in step S33, the seating determination unit 203 determines whether or not the subject boarding from the entrance has been seated on an empty seat. Here, when determination is made that the subject has not been seated on the empty seat (NO in step S33), determination of step S33 will be repeated until the subject is seated on the empty seat.

On the other hand, when determination is made that the subject is seated on the empty seat (YES in step S33), the seating information generation unit 206 generates seating information which correlates the subject determined by the person determination unit 205 with the seat being seated in step S34. The seating information generation unit 206 stores the generated seating information in the seating information storage unit 241.

Although in the first embodiment, the person determination unit 205 determines a subject boarding from the entrance before the subject is seated on an empty seat, the present disclosure is not particularly limited thereto, and the person determination unit may determine a subject seated on an empty seat after the subject has boarded from the entrance.

Next, in step S35, the seat control information generation unit 207 generates seat control information for moving a seat seated by a subject to an arbitrary position. The seat seated by a subject may not necessarily be moved. In a case where the seat seated by a subject is not moved, the processing in step S35 and step S36 is omitted.

Next, in step S36, the seat control information generation unit 207 outputs the generated seat control information to the seat movement control unit 25. The seat movement control unit 25 controls the seat driving unit 26 according to the seat control information generated by the seat control information generation unit 207 to move the seat seated by the subject to an arbitrary position.

Next, in step S37, the seat control information generation unit 207 determines whether or not all the subjects have boarded. Here, when determination is made that not all the subjects have boarded (NO in step S37), the processing returns to step S29 and the next subject boards.

On the other hand, when determination is made that all the subjects have boarded (YES in step S37), the vehicle movement control unit 27 causes the automobile 2 to move to one get-off position among the plurality of get-off positions in step S38. The vehicle control information generation unit 208 generates vehicle control information for moving the automobile 2 to one get-off position among the plurality of get-off positions according to the transport route information included in the transport plan information and outputs the generated vehicle control information to the vehicle movement control unit 27. The vehicle movement control unit 27 controls the vehicle driving unit 28 according to the vehicle control information generated by the vehicle control information generation unit 208 to move the automobile 2 to the get-off position.

Next, in step S39, the get-off position determination unit 204 determines whether or not the automobile 2 has arrived at the get-off position. At this time, the GPS receiver 23 obtains a current position of the automobile 2. The get-off position determination unit 204 determines whether or not the current position of the automobile 2 obtained by the GPS receiver 23 coincides with the get-off position. When determining that the current position of the automobile 2 obtained by the GPS receiver 23 coincides with the get-off position, the get-off position determination unit 204 determines that the automobile 2 has arrived at the get-off position. When determining that the current position of the automobile 2 obtained by the GPS receiver 23 does not coincide with the get-off position, the get-off position determination unit 204 determines that the automobile 2 has not yet arrived at the get-off position.

Here, when determination is made that the automobile 2 has not yet arrived at the get-off position (NO in step S39), the processing returns to step S38.

On the other hand, when determination is made that the automobile 2 has arrived at the get-off position (YES in step S39), the seat control information generation unit 207 refers to the seating information stored in the seating information storage unit 241 to generate seat control information for moving a seat correlated with a subject who gets off at the get-off position to the exit in step S40.

Next, in step S41, the seat control information generation unit 207 outputs the generated seat control information to the seat movement control unit 25. The seat movement control unit 25 controls the seat driving unit 26 according to the seat control information generated by the seat control information generation unit 207 to move the seat seated by the subject who gets off at the get-off position to the exit.

Next, in step S42, the seat control information generation unit 207 determines whether or not the subjects have gotten off at all the get-off positions included in the transport plan information. Here, when determination is made that the subjects have not gotten off at all the get-off positions (NO in step S42), the processing returns to step S38 and the automobile 2 moves to the next get-off position.

On the other hand, when determination is made that the subjects have gotten off at all the get-off positions (YES in step S42), the processing ends.

In this manner, among the plurality of seats provided in the automobile 2, since a seat specified by the transport plan information for transporting the plurality of subjects using the automobile 2 is moved to the entrance or the exit, the seat will be moved to the entrance when a subject to be transported boards, and the seat will be moved to the exit when a subject to be transported gets off, resulting in enabling a subject to be transported to smoothly board the automobile 2, as well as enabling the subject to be transported to smoothly get off from the automobile 2.

In the first embodiment, the communication unit 21 of the automobile 2 may obtain updated transport plan information during transport of a plurality of subjects using the transport plan information obtained from the terminal apparatus 1. In this case, the seat control information generation unit 207 generates seat control information using the updated transport plan information. For example, in a case where the transport type is the second transport type, a get-off order of subjects has been changed, and a transport route has been changed, when determination is made that the automobile 2 has arrived at the changed get-off position, the seat control information generation unit 207 generates seat control information for moving, to the exit, a seat correlated with a subject who will get off at the changed get-off position.

Additionally, the automobile 2 may further include an input unit which, in a case of the second transport type as a transport type, accepts change in a get-off order of a plurality of subjects, the change being made by a staff during transport of the plurality of subjects.

Although in the first embodiment, the automobile control system 100 includes the terminal apparatus 1 and the automobile 2, the present disclosure is not particularly limited thereto. The automobile control system 100 may include the terminal apparatus 1, the automobile 2, and a server. In this case, the server is communicably connected to the terminal apparatus 1 and the automobile 2 via a network. The server includes a communication unit, the transport plan creating unit 101, and the subject information storage unit 141. The terminal apparatus 1 includes neither the transport plan creating unit 101 nor the subject information storage unit 141. The communication unit 15 of the terminal apparatus 1 transmits, to the server, information indicative of a transport type and identification information of the plurality of subjects input by the input unit 12. The communication unit of the server receives the information indicative of a transport type and the identification information of the plurality of subjects transmitted by the terminal apparatus 1.

Then, the transport plan creating unit 101 of the server reads boarding position information, transport destination information, transport source information, and get-off position information correlated with the received identification information of the plurality of subjects from the subject information storage unit 141 to create transport route information based on information indicative of a transport type, transport source information of the plurality of subjects, and get-off position information of the plurality of subjects. In a case where the transport type is the first transport type, the transport plan creating unit 101 of the server creates transport plan information including information indicative of a transport type, identification information of the plurality of subjects, boarding position information of the plurality of subjects, transport destination information of the plurality of subjects, and transport route information, and in a case where the transport type is the second transport type, the transport plan creating unit 101 creates transport plan information including information indicative of a transport type, identification information of the plurality of subjects, transport source information of the plurality of subjects, get-off position information of the plurality of subjects, and transport route information. The communication unit of the server transmits the transport plan information created by the transport plan creating unit 101 to the automobile 2.

Further, although in the first embodiment, the automobile control system 100 includes the terminal apparatus 1 and the automobile 2, the present disclosure is not particularly limited thereto, and the automobile control system 100 may include the automobile 2 and the server without including the terminal apparatus 1. In this case, the server is communicably connected to the automobile 2 via the network. The server includes a communication unit and the subject information storage unit 141. The automobile 2 includes an input unit, a display unit, and a transport plan creating unit in addition to the configuration in FIG. 3. The input unit has the same configuration as that of the input unit 12 of the terminal apparatus 1, the display unit has the same configuration as that of the display unit 11 of the terminal apparatus 1, and the transport plan creating unit has the same configuration as that of the transport plan creating unit 101 of the terminal apparatus 1. The input unit of the automobile 2 accepts input of information indicative of a transport type and identification information of the plurality of subjects. The communication unit 21 of the automobile 2 transmits, to the server, the identification information of the plurality of subjects input by the input unit.

Then, the communication unit of the server receives the identification information of the plurality of subjects transmitted by the automobile 2. The communication unit of the server reads boarding position information, transport destination information, transport source information, and get-off position information correlated with the received identification information of the plurality of subjects from the subject information storage unit 141 and transmits the received information to the automobile 2. The communication unit 21 of the automobile 2 receives the boarding position information, the transport destination information, the transport source information, and the get-off position information transmitted by the server. The transport plan creating unit of the automobile 2 creates transport route information based on the information indicative of a transport type, the transport source information of the plurality of subjects, and the get-off position information of the plurality of subjects. In a case where the transport type is the first transport type, the transport plan creating unit of the automobile 2 creates transport plan information including the information indicative of a transport type, the identification information of the plurality of subjects, the boarding position information of the plurality of subjects, the transport destination information of the plurality of subjects, and the transport route information, and in a case where the transport type is the second transport type, the transport plan creating unit creates transport plan information including the information indicative of a transport type, the identification information of the plurality of subjects, the transport source information of the plurality of subjects, the get-off position information of the plurality of subjects, and the transport route information. After creating the transport plan information, the automobile 2 conducts the same processing as that of the above first embodiment.

Second Embodiment

In the first embodiment, in a case where a transport type is the first transport type and a plurality of subjects boards at a boarding position, and in a case where the transport type is the second transport type and a plurality of subjects boards at a transport source, seats of the plurality of subjects are moved not to specifically determined positions but to arbitrary positions. By contrast, in the second embodiment, in a case where the transport type is the first transport type and a plurality of subjects boards at a boarding position, and in a case where the transport type is the second transport type and the plurality of subjects boards at a transport source, seats of the plurality of subjects are moved to positions assigned in advance.

An automobile control system of the second embodiment has the same configuration as that of the first embodiment, and the automobile control system of the second embodiment includes a terminal apparatus 1A and an automobile 2A.

Figure 10:
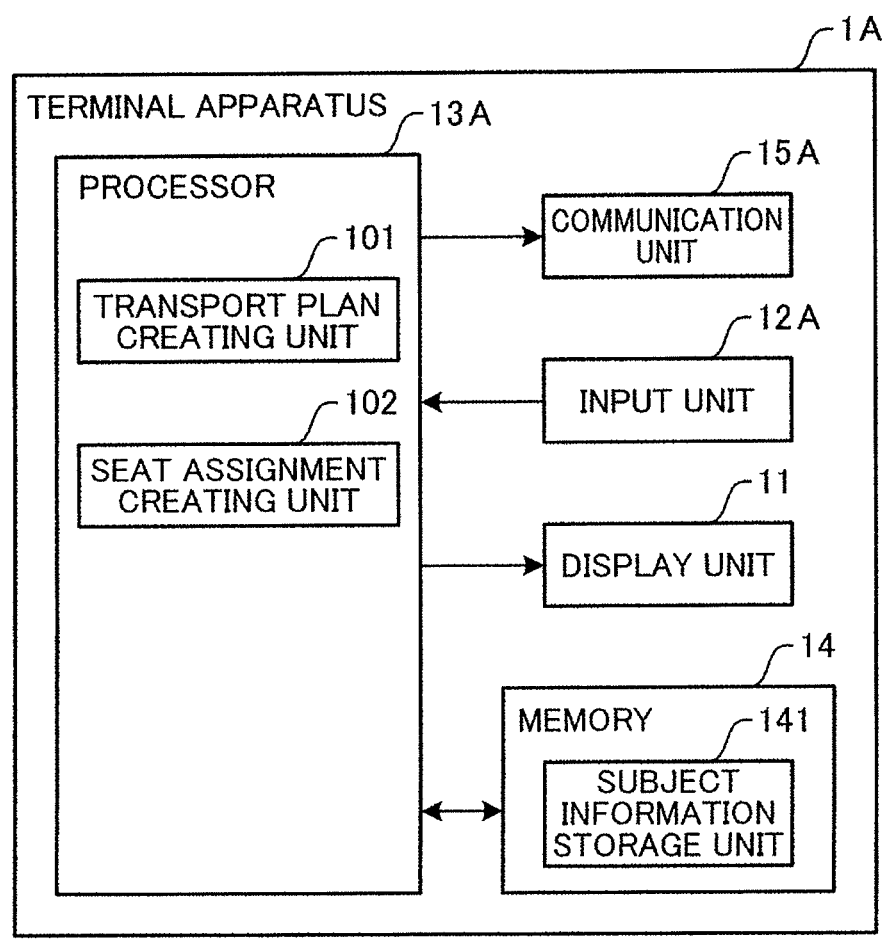
FIG. 10 is a block diagram showing a configuration of a terminal apparatus according to a second embodiment of the present disclosure.

FIG. 10 is a block diagram showing a configuration of the terminal apparatus according to the second embodiment of the present disclosure.

The terminal apparatus 1A shown in FIG. 10 includes a display unit 11, an input unit 12A, a processor 13A, a memory 14, and a communication unit 15A. In FIG. 10, the same components as those of the terminal apparatus in the first embodiment are given the same reference signs to omit descriptions thereof.

The input unit 12A is, for example, a mouse, a key board or a touch panel, and accepts input, by an operator, of information related to a plurality of subjects to be transported using the automobile 2A. The operator inputs the information related to the plurality of subjects to an input screen displayed in the display unit 11. The input unit 12A also accepts input, by an operator, of assignment of seat position to the plurality of subjects to be transported. The operator inputs positions of seats to be seated by the plurality of subjects to the input screen displayed in the display unit 11.

Specifically, in a case where a subject is a care receiver, the subject needs to be seated near a seat of a care assistant depending on the subject's condition. Some subjects may have their favorite seat positions such as a seat on the front side or a seat by the window. The operator therefore inputs positions of seats to be seated by the plurality of subjects in advance.

In a case where the transport type is the first transport type, the input unit 12A accepts input, by the operator, of a get-off order of the plurality of subjects at a transport destination (get-off position).

Specifically, in a case where subjects are care receivers, it is better for some subjects to get off first and some subjects to get off last. The operator therefore inputs the get-off order of the plurality of subjects in advance.

The processor 13A includes a transport plan creating unit 101 and a seat assignment creating unit 102.

Based on seat positions respectively assigned to a plurality of subjects to be transported which are input by the input unit, the seat assignment creating unit 102 creates seat position information indicative of assignment of seat positions to the plurality of subjects to be transported.

The communication unit 15A transmits, to the automobile 2, transport plan information created by the transport plan creating unit 101 and the seat position information created by the seat assignment creating unit 102. In a case where the transport type is the first transport type, the communication unit 15A transmits get-off order information indicative of a get-off order of the plurality of subjects at a transport destination (get-off position) to the automobile 2.

Although in the second embodiment, positions of seats respectively assigned to the plurality of subjects to be transported are input by the operator, the present disclosure is not particularly limited thereto. The seat assignment creating unit 102 may automatically assign positions of seats to be seated by the plurality of subjects to be transported.

Additionally, a subject information storage unit 141 may store in advance a plurality of subjects registered in advance and seat positions respectively assigned to the plurality of subjects so as to be correlated with each other. In this case, the input unit 12A need not accept input of the respective seat positions of the plurality of subjects to be transported. The seat assignment creating unit 102 may read seat positions correlated with the input identification information of the plurality of subjects from the subject information storage unit 141.

The operator may not necessarily input the get-off order information, and the communication unit 15A may not necessarily transmit the get-off order information even when the transport type is the first transport type.

Figure 11:
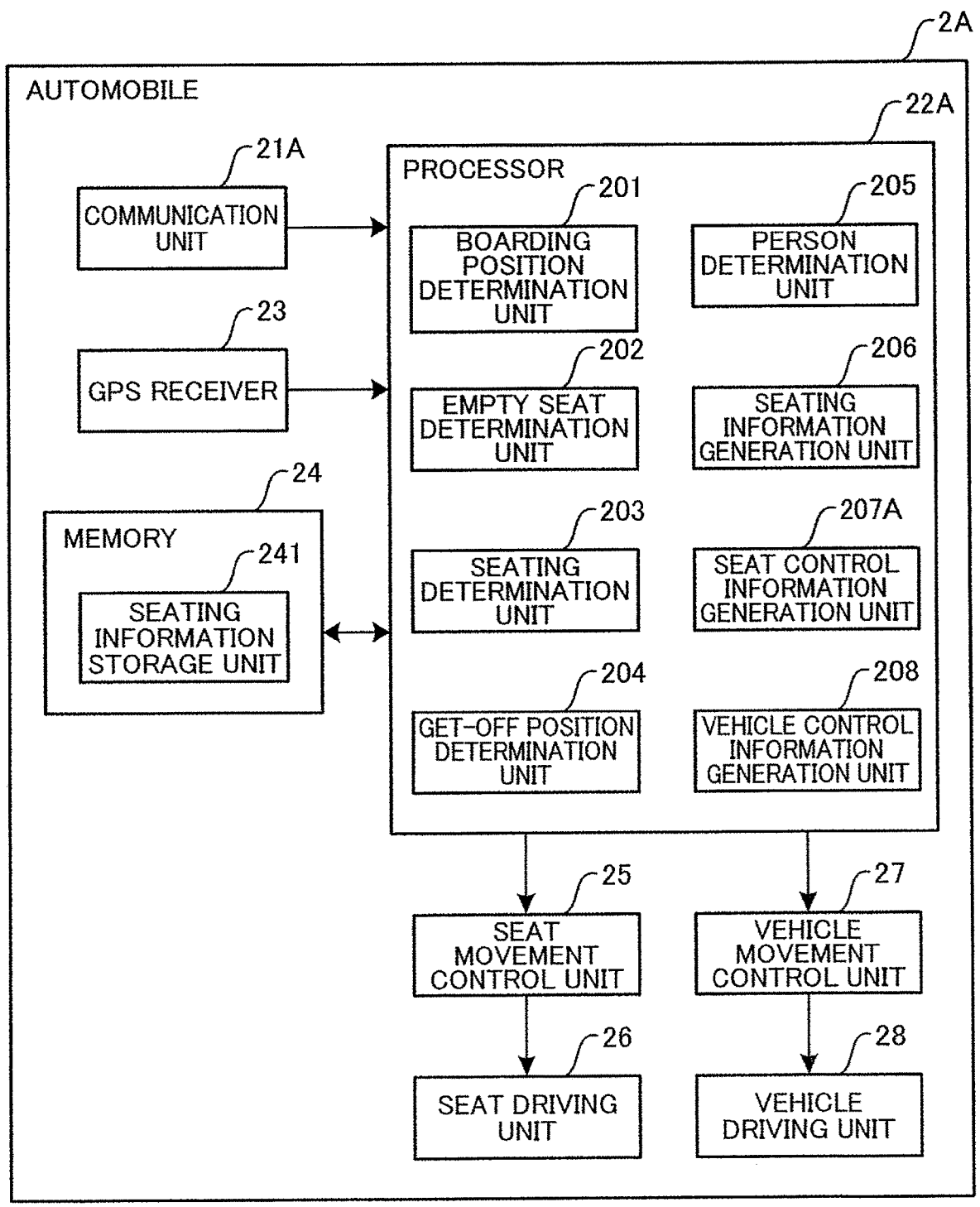
FIG. 11 is a block diagram showing a configuration of an automobile according to the second embodiment of the present disclosure.

FIG. 11 is a block diagram showing a configuration of the automobile according to the second embodiment of the present disclosure.

The automobile 2A shown in FIG. 11 includes a communication unit 21A, a processor 22A, a GPS receiver 23, a memory 24, a seat movement control unit 25, a seat driving unit 26, a vehicle movement control unit 27, and a vehicle driving unit 28. In FIG. 11, the same components as those of the automobile in the first embodiment are given the same reference signs to omit descriptions thereof.

The communication unit 21A receives the transport plan information and the seat position information transmitted by the terminal apparatus 1A. The communication unit 21A obtains seat position information indicative of assignment of the seat positions respectively to the plurality of subjects to be transported.

The communication unit 21A also receives the get-off order information indicative of a get-off order of the plurality of subjects to be transported by the automobile 2A from the terminal apparatus 1A in a case where the transport type is the first transport type. The communication unit 21A obtains the get-off order information indicative of a get-off order of the plurality of subjects to be transported by the automobile 2A.

The processor 22A includes a boarding position determination unit 201, an empty seat determination unit 202, a seating determination unit 203, a get-off position determination unit 204, a person determination unit 205, a seating information generation unit 206, a seat control information generation unit 207A, and a vehicle control information generation unit 208.

When determination is made by the seating determination unit 203 that a boarding subject has been seated on a seat, the seat control information generation unit 207A generates seat control information for moving the seat to a position assigned to the boarding subject according to the seat position information.

In a case where the transport type is the first transport type and determination is made that the automobile 2A has arrived at the transport destination (get-off position), the seat control information generation unit 207A also generates seat control information for moving a seat of a subject who gets off at a transport destination (get-off position) to the exit according to an order indicated by the get-off order information. In the second embodiment, in a case where the transport type is the first transport type, a plurality of subjects boarding at a plurality of boarding positions get off at one transport destination (get-off position). Then, when the plurality of subjects get off at one transport destination (get-off position), the plurality of subjects get off according to a predetermined get-off order.

In a case where the transport type is the second transport type and determination is made that a boarding subject has been seated, the seat control information generation unit 207A generates seat control information for moving a seat correlated with the subject determined by the person determination unit 205 to a position assigned to the subject according to the seat position information.

Subsequently, description will be made of operation of the terminal apparatus 1A according to the second embodiment of the present disclosure.

Figure 12:
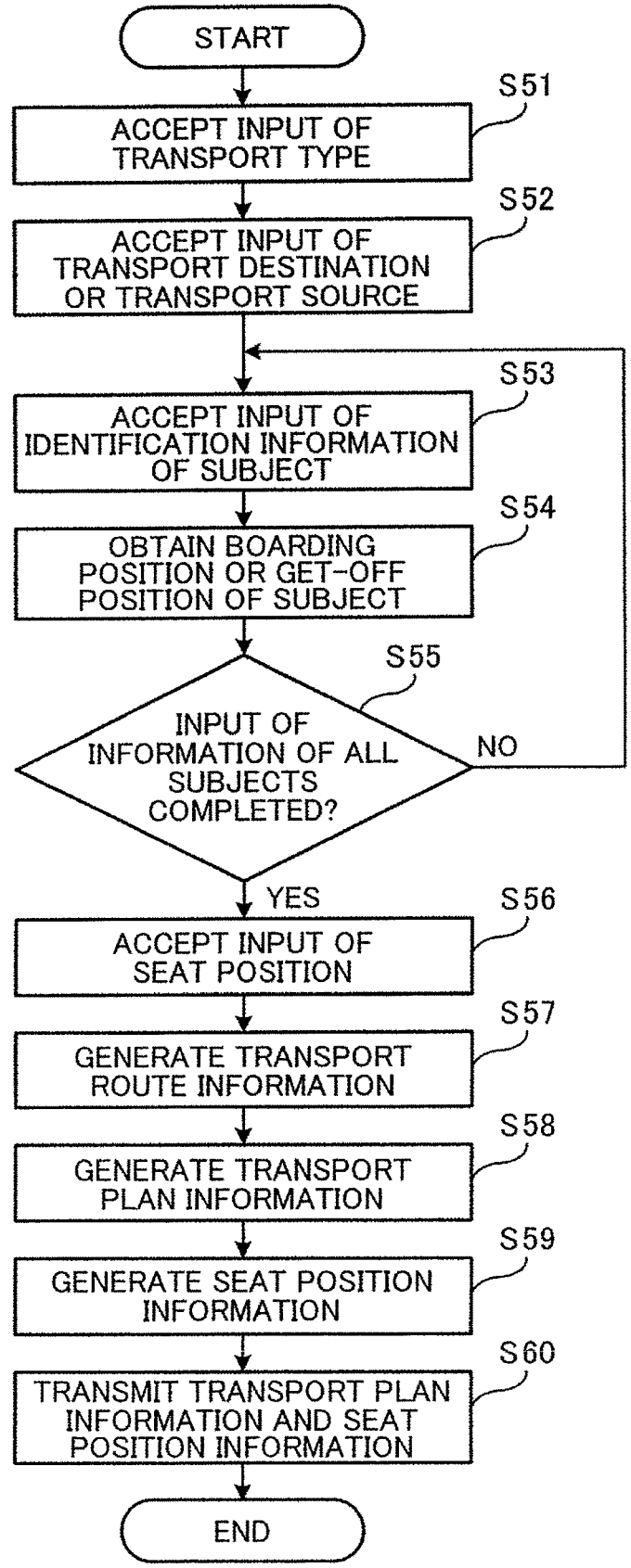
FIG. 12 is a flow chart for describing operation of the terminal apparatus according to the second embodiment of the present disclosure.

FIG. 12 is a flow chart for describing operation of the terminal apparatus according to the second embodiment of the present disclosure.

Since processing of step S51 to step S55 is the same as the processing of step S1 to step S5 in FIG. 5, description thereof will be omitted.

Next, in step S56, the input unit 12A accepts input, by the operator, of seat positions respectively assigned to the plurality of subjects. The operator inputs at which seat position in the automobile 2A, each of the plurality of subjects are seated when the plurality of subjects boards the automobile 2A.

Since processing of step S57 to step S58 is the same as the processing of step S6 to step S7 in FIG. 5, description thereof will be omitted.

Next, in step S59, the seat assignment creating unit 102 creates seat position information indicative of assignment of the seat positions respectively to the plurality of subjects to be transported based on the seat positions respectively assigned to the plurality of subjects to be transported which are input by the input unit 12A.

Next, in step S60, the communication unit 15A transmits the transport plan information created by the transport plan creating unit 101 and the seat position information created by the seat assignment creating unit 102 to the automobile 2A.

In a case where the transport type whose input has been accepted in step S51 is the first transport type, the input unit 12A accepts input, by the operator, of the get-off order information indicative of a get-off order of the plurality of subjects at a transport destination (get-off position) after the processing of step S56. Then, in step S60, the communication unit 15A transmits the transport plan information created by the transport plan creating unit 101, the seat position information created by the seat assignment creating unit 102, and the get-off order information input by the input unit 12A to the automobile 2A.

Subsequently, description will be made of operation of the automobile 2A according to the second embodiment of the present disclosure.

Figure 13:
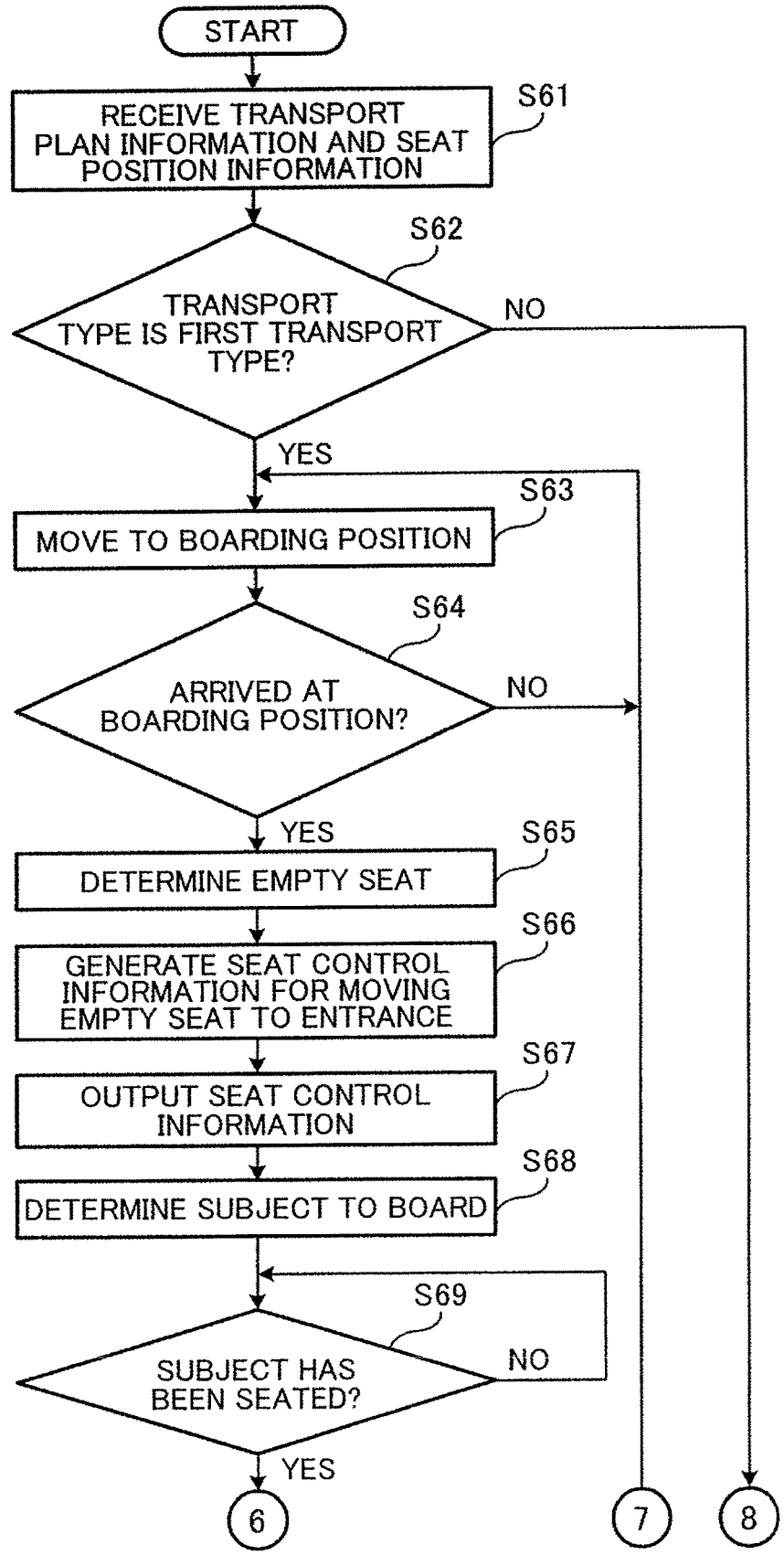
FIG. 13 is a first flow chart for describing operation of the automobile according to the second embodiment of the present disclosure.
Figure 14:
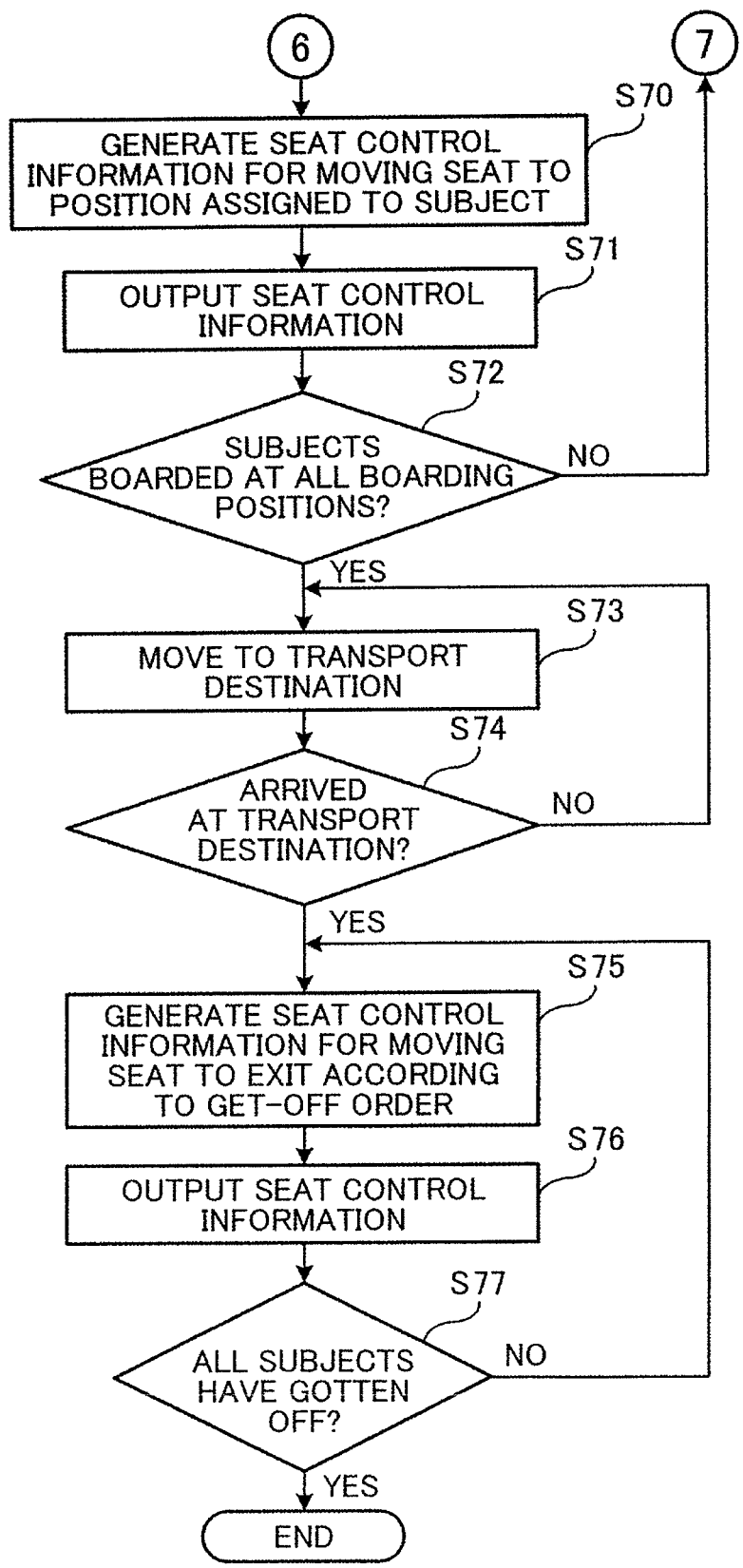
FIG. 14 is a second flow chart for describing operation of the automobile according to the second embodiment of the present disclosure.
Figure 15:
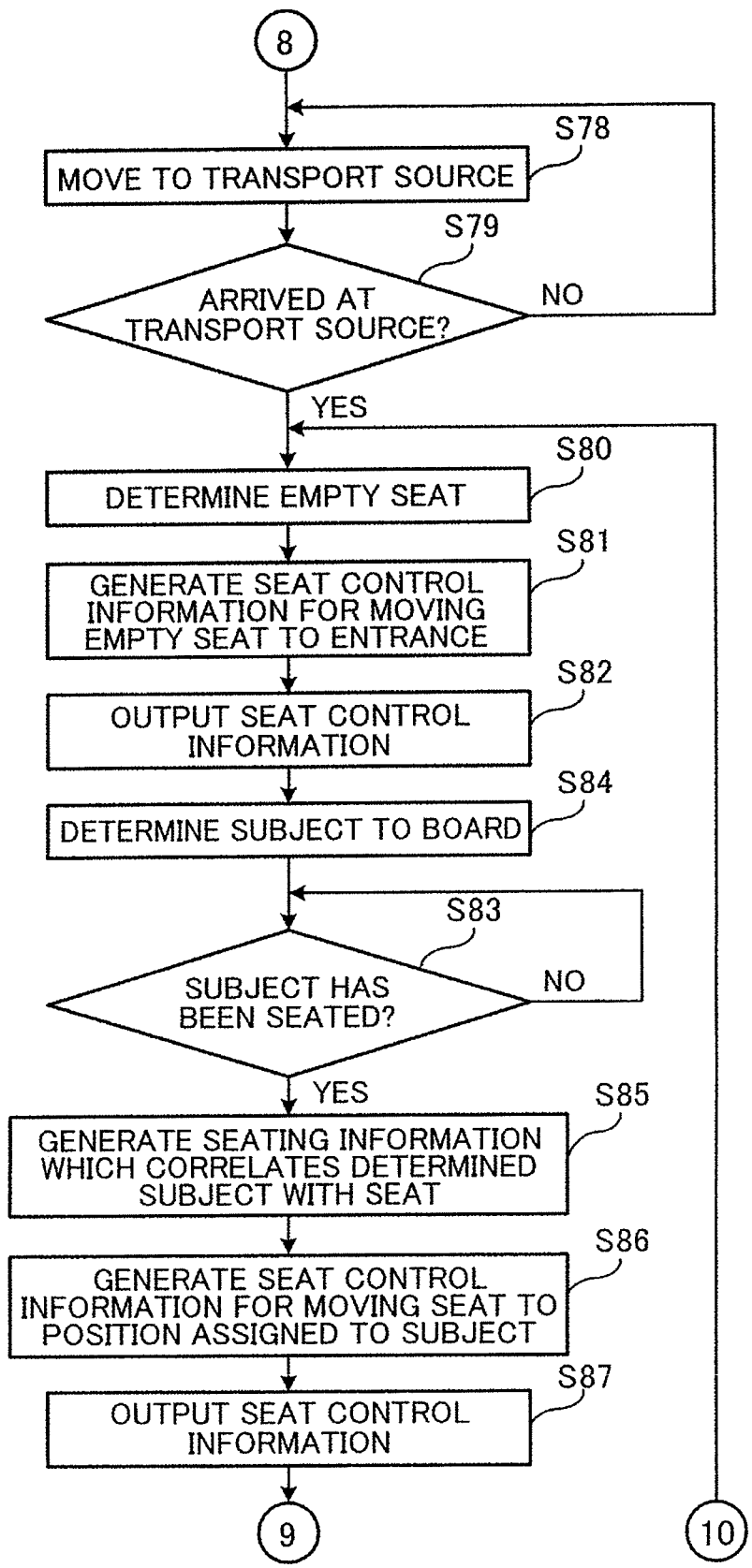
FIG. 15 is a third flow chart for describing operation of the automobile according to the second embodiment of the present disclosure.
Figure 16:
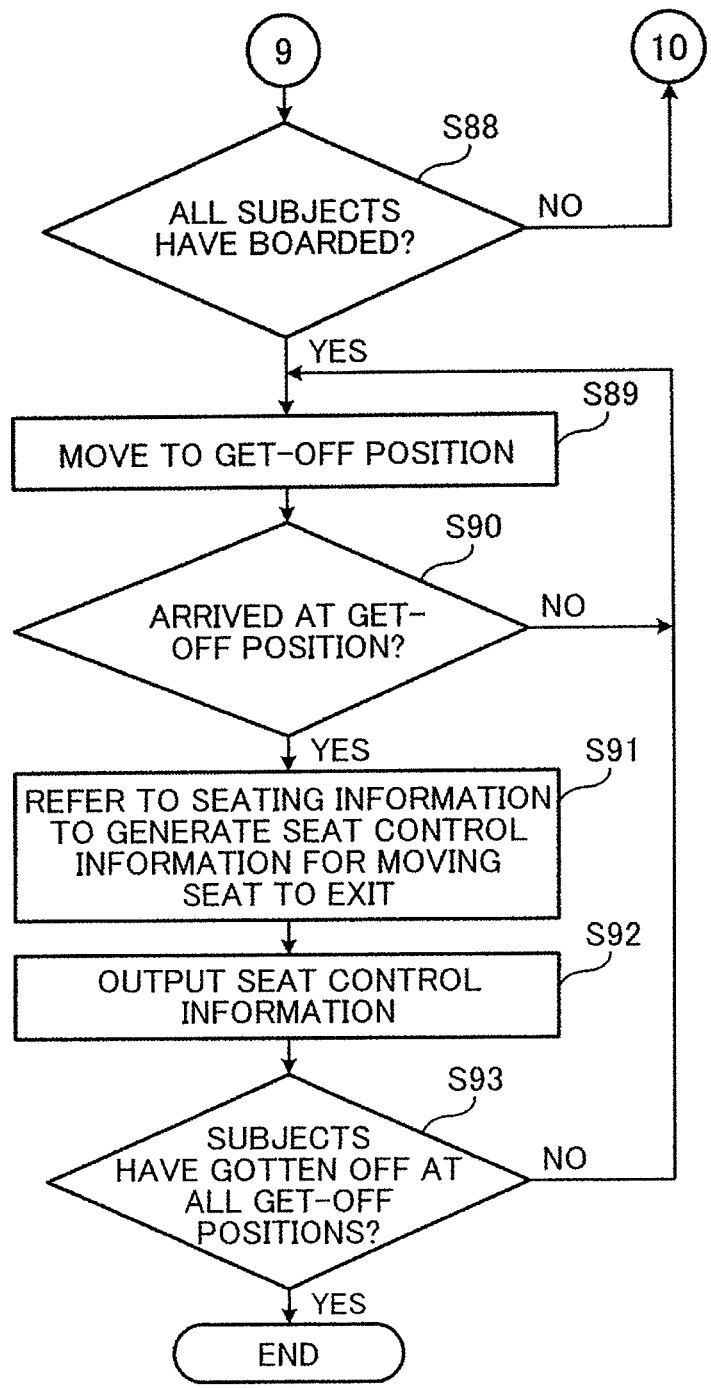
FIG. 16 is a fourth flow chart for describing operation of the automobile according to the second embodiment of the present disclosure.

FIG. 13 is a first flow chart for describing operation of the automobile according to the second embodiment of the present disclosure, FIG. 14 is a second flow chart for describing operation of the automobile according to the second embodiment of the present disclosure, FIG. 15 is a third flow chart for describing operation of the automobile according to the second embodiment of the present disclosure, and FIG. 16 is a fourth flow chart for describing operation of the automobile according to the second embodiment of the present disclosure.

First, in step S61, the communication unit 21A receives the transport plan information and the seat position information transmitted by the terminal apparatus 1A. In a case where the transport type included in the transport plan information is the first transport type, the communication unit 21A further receives the get-off order information.

Since processing of step S62 to step S67 is the same as the processing of step S12 to step S17 in FIG. 6, description thereof will be omitted.

Next, in step S68, the person determination unit 205 determines a subject boarding from the entrance. The person determination unit 205 specifies which subject included in the transport plan information the subject boarding from the entrance corresponds to.

Next, in step S69, the seating determination unit 203 determines whether or not the subject boarding from the entrance has been seated on an empty seat. Here, when determination is made that the subject has not been seated on the empty seat (NO in step S69), the determination of step S69 will be repeated until the subject is seated on the empty seat.

On the other hand, when determination is made that the subject has been seated on the empty seat (YES in step S69), the seat control information generation unit 207A generates seat control information for moving the seat seated by the subject to a position assigned to the subject which is indicated by the seat position information in step S70.

Next, in step S71, the seat control information generation unit 207A outputs the generated seat control information to the seat movement control unit 25. The seat movement control unit 25 controls the seat driving unit 26 according to the seat control information generated by the seat control information generation unit 207A to move the seat seated by the subject to the position assigned to the subject and indicated by the seat position information.

Since processing of step S72 to step S74 is the same as the processing of step S21 to step S23 in FIG. 7, description thereof will be omitted.

When determination is made that the automobile 2A has arrived at the transport destination (YES in step S74), the seat control information generation unit 207A generates seat control information for moving, to the exit, a seat correlated with a subject who gets off at the transport destination according to a get-off order indicated by the get-off order information in step S75. In the second embodiment, since all of the plurality of subjects get off at one transport destination, the seats seated by the plurality of subjects are sequentially moved to the exit. At this time, the respective seats will be moved in the order indicated by the get-off order information.

Next, in step S76, the seat control information generation unit 207A outputs the generated seat control information to the seat movement control unit 25. The seat movement control unit 25 controls the seat driving unit 26 according to the seat control information generated by the seat control information generation unit 207A to move the seat seated by the subject to the exit.

Since processing of step S77 is the same as the processing of step S26 in FIG. 7, description thereof will be omitted.

In a case where the transport type is not determined to be the first transport type in step S62 in FIG. 13, that is, determination is made that the transport type is the second transport type (NO in step S62), the vehicle movement control unit 27 causes the automobile 2A to move to the transport sources as the boarding positions of the plurality of subjects in step S78.

Since processing of S78 to step S85 is the same as the processing of step S27 to step S34 in FIG. 8, description thereof will be omitted.

Next, in step S86, the seat control information generation unit 207A generates seat control information for moving a seat seated by a subject to a position assigned to the subject which is indicated by the seat position information.

Next, in step S87, the seat control information generation unit 207A outputs the generated seat control information to the seat movement control unit 25. The seat movement control unit 25 controls the seat driving unit 26 according to the seat control information generated by the seat control information generation unit 207A to move the seat seated by the subject to a position assigned to the subject which is indicated by the seat position information.

Since processing of step S88 to step S93 is the same as the processing of step S37 to step S42 in FIG. 9, description thereof will be omitted.

In the second embodiment, the communication unit 21A of the automobile 2A may obtain updated transport plan information during transport of a plurality of subjects using the transport plan information obtained from the terminal apparatus 1A. In this case, the seat control information generation unit 207A generates seat control information using the updated transport plan information. For example, in a case where the transport type is the second transport type, an order of get-off of subjects has been changed, and a transport route has been changed, when determination is made that the automobile 2A has arrived at the changed get-off position, the seat control information generation unit 207A generates seat control information for moving, to the exit, a seat correlated with a subject who will get off at the changed get-off position.

Additionally, the automobile 2A may further include an input unit which, in a case of the second transport type as a transport type, accepts change in a get-off order of a plurality of subjects, the change being made by a staff during transport of the plurality of subjects.

Although in the second embodiment, the automobile control system includes the terminal apparatus 1A and the automobile 2A, the present disclosure is not particularly limited thereto. The automobile control system may include the terminal apparatus 1A, the automobile 2A, and a server. In this case, the server is communicably connected to the terminal apparatus 1A and the automobile 2A via a network. The server includes a communication unit, the transport plan creating unit 101, the seat assignment creating unit 102, and the subject information storage unit 141. The terminal apparatus 1A includes none of the transport plan creating unit 101, the seat assignment creating unit 102, and the subject information storage unit 141. The communication unit 15A of the terminal apparatus 1A transmits, to the server, information indicative of a transport type, identification information of the plurality of subjects, and a position of a seat assigned to each of the plurality of subjects input by the input unit 12A. The communication unit of the server receives the information indicative of a transport type, the identification information of the plurality of subjects, and the position of a seat assigned to each of the plurality of subjects transmitted by the terminal apparatus 1A.

Then, the transport plan creating unit 101 of the server reads boarding position information, transport destination information, transport source information, and get-off position information correlated with the received identification information of the plurality of subjects from the subject information storage unit 141 to create transport route information based on the information indicative of a transport type, the transport source information of the plurality of subjects, and the get-off position information of the plurality of subjects. In a case where the transport type is the first transport type, the transport plan creating unit 101 of the server creates transport plan information including the information indicative of a transport type, the identification information of the plurality of subjects, the boarding position information of the plurality of subjects, the transport destination information of the plurality of subjects, and the transport route information, and in a case where the transport type is the second transport type, the transport plan creating unit 101 creates transport plan information including the information indicative of a transport type, the identification information of the plurality of subjects, the transport source information of the plurality of subjects, the get-off position information of the plurality of subjects, and the transport route information. The seat assignment creating unit 102 of the server creates seat position information indicative of assignment of the seat positions respectively to the plurality of subjects to be transported based on the respective positions of seats assigned to the plurality of subjects. The communication unit of the server transmits the transport plan information created by the transport plan creating unit 101 and the seat position information created by the seat assignment creating unit 102 to the automobile 2A.

Further, although in the second embodiment, the automobile control system includes the terminal apparatus 1A and the automobile 2A, the present disclosure is not particularly limited thereto, and the automobile control system may not include the terminal apparatus 1A but may include the automobile 2A and a server. In this case, the server is communicably connected to the automobile 2A via a network. The server includes a communication unit and the subject information storage unit 141. The automobile 2A includes an input unit, a display unit, a transport plan creating unit, and a seat assignment creating unit in addition to the configuration in FIG. 11. The input unit has the same configuration as that of the input unit 12A of the terminal apparatus 1A, the display unit has the same configuration as that of the display unit 11 of the terminal apparatus 1A, the transport plan creating unit has the same configuration as that of the transport plan creating unit 101 of the terminal apparatus 1A, and the seat assignment creating unit has the same configuration as that of the seat assignment creating unit 102 of the terminal apparatus 1A. The input unit of the automobile 2A accepts input of the information indicative of a transport type and the identification information of the plurality of subjects. The communication unit 21A of the automobile 2A transmits the identification information of the plurality of subjects input by the input unit to the server.

Then, the communication unit of the server receives the identification information of the plurality of subjects transmitted by the automobile 2A. The communication unit of the server reads the boarding position information, the transport destination information, the transport source information, and the get-off position information correlated with the received identification information of the plurality of subjects from the subject information storage unit 141 and transmits the information to the automobile 2A. The communication unit 21A of the automobile 2A receives the boarding position information, the transport destination information, the transport source information, and the get-off position information transmitted by the server. The transport plan creating unit of the automobile 2A creates transport route information based on the information indicative of a transport type, the transport source information of the plurality of subjects, and the get-off position information of the plurality of subjects. In a case where the transport type is the first transport type, the transport plan creating unit of the automobile 2A creates transport plan information including the information indicative of a transport type, the identification information of the plurality of subjects, the boarding position information of the plurality of subjects, the transport destination information of the plurality of subjects, and the transport route information, and in a case where the transport type is the second transport type, the transport plan creating unit creates transport plan information including the information indicative of a transport type, the identification information of the plurality of subjects, the transport source information of the plurality of subjects, the get-off position information of the plurality of subjects, and the transport route information. The seat assignment creating unit of the automobile 2A creates seat position information indicative of assignment of the seat positions respectively to the plurality of subjects to be transported based on the positions of the seats respectively assigned to the plurality of subjects. The automobile 2A conducts the same processing as that of the above second embodiment after creating the seat position information.

Third Embodiment

While in the second embodiment, a boarding subject is determined by personal authentication, in a third embodiment, a boarding subject is specified by allowing a plurality of subjects to board in a predetermined order without determining a boarding subject.

Figure 17:
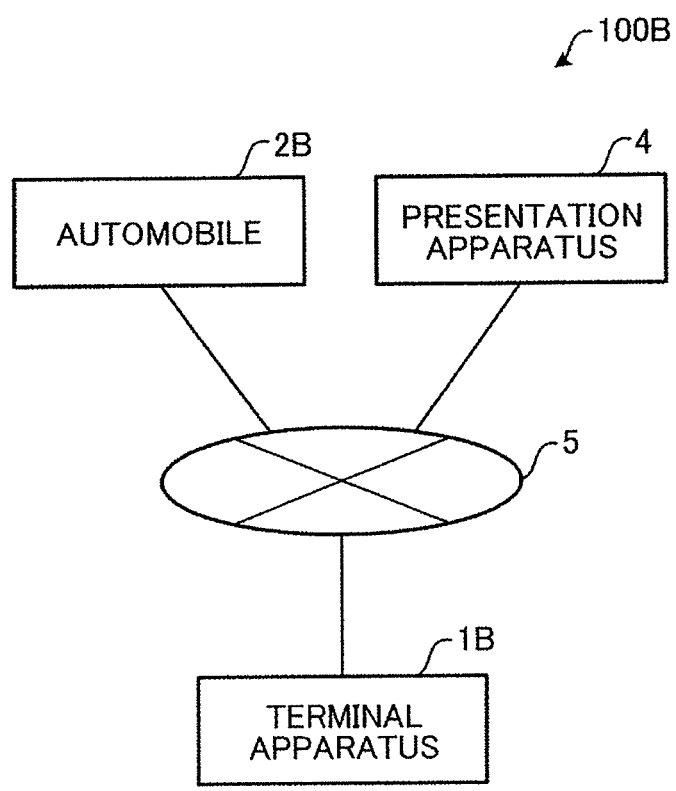
FIG. 17 is a diagram showing an overall configuration of an automobile control system according to a third embodiment of the present disclosure.

FIG. 17 is a diagram showing an overall configuration of an automobile control system according to a third embodiment of the present disclosure.

An automobile control system 100B shown in FIG. 17 includes a terminal apparatus 1B, an automobile 2B, and a presentation apparatus 4. The terminal apparatus 1B and the presentation apparatus 4 are communicably connected to the automobile 2B via a network 5. The network 5 is, for example, the Internet.

The terminal apparatus 1B is, for example, a personal computer, a smart phone, or a tablet computer, which creates a transport plan for transporting a plurality of subjects by the automobile 2B.

The automobile 2B is one example of a mobile body and transports a plurality of subjects according to a transport plan created by the terminal apparatus 1B. For example, in transport service of transporting a plurality of care receivers from the respective houses to a care facility, after going to the respective houses of the plurality of care receivers to pick them up and allowing the plurality of care receivers to board, the automobile 2B allows the plurality of care receivers to get off at the care facility. In transport service of transporting a plurality of care receivers from a care facility to the respective houses, the automobile 2B allows the plurality of care receivers to board at the care facility and get off at the respective houses.

The presentation apparatus 4 is, for example, a smart phone or a tablet computer, and when allowing the plurality of subjects to board the automobile 2B at transport sources, the presentation apparatus is provided near the automobile 2B to present boarding order information indicative of an order of the plurality of subjects to be transported boarding the automobile 2B.

Figure 18:
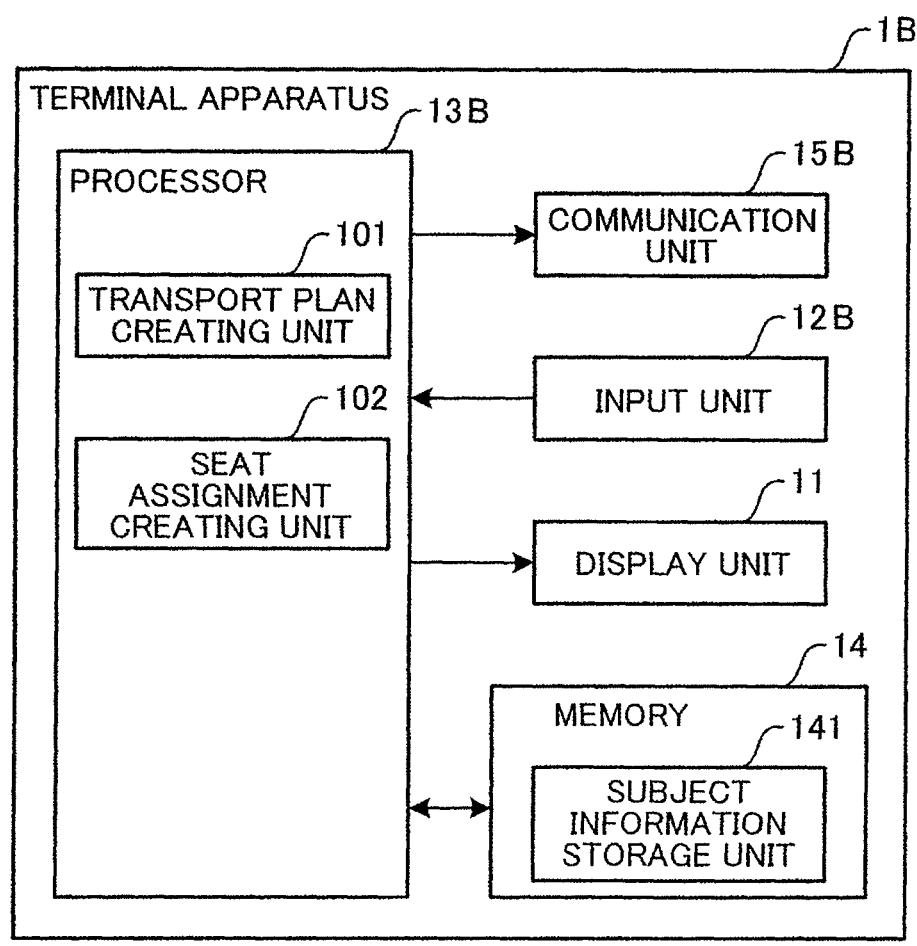
FIG. 18 is a block diagram showing a configuration of a terminal apparatus according to the third embodiment of the present disclosure.

FIG. 18 is a block diagram showing a configuration of the terminal apparatus according to the third embodiment of the present disclosure.

The terminal apparatus 1B shown in FIG. 18 includes a display unit 11, an input unit 12B, a processor 13B, a memory 14, and a communication unit 15B. In FIG. 18, the same components as those of the terminal apparatuses in the first embodiment and the second embodiment are given the same reference signs to omit descriptions thereof.

The input unit 12B is, for example, a mouse, a key board, or a touch panel, and accepts input, by an operator, of information related to a plurality of subjects to be transported using the automobile 2B. The operator inputs the information related to the plurality of subjects to an input screen displayed in the display unit 11. The input unit 12B also accepts input, by an operator, of assignment of seat positions to the plurality of subjects to be transported. The operator inputs positions of seats to be seated by the plurality of subjects to the input screen displayed in the display unit 11.

In a case where the transport type is the second transport type, the input unit 12B accepts input, by the operator, of a boarding order of the plurality of subjects at a transport source (boarding position).

In other words, when the boarding order of the plurality of subjects are determined in advance, it is possible to easily specify who has boarded without the need of determining who has boarded using personal authentication at the time of boarding of the plurality of subjects.

The communication unit 15B transmits, to the automobile 2B, transport plan information created by the transport plan creating unit 101 and seat position information created by the seat assignment creating unit 102. In a case where the transport type is the second transport type, the communication unit 15B transmits boarding order information indicative of a boarding order of the plurality of subjects at a transport source (boarding position) to the automobile 2B.

Although in the third embodiment, the boarding order of the plurality of subjects to be transported is input by the operator, the present disclosure is not particularly limited thereto. The processor 13B may automatically determine a boarding order of the plurality of subjects to be transported.

Figure 19:
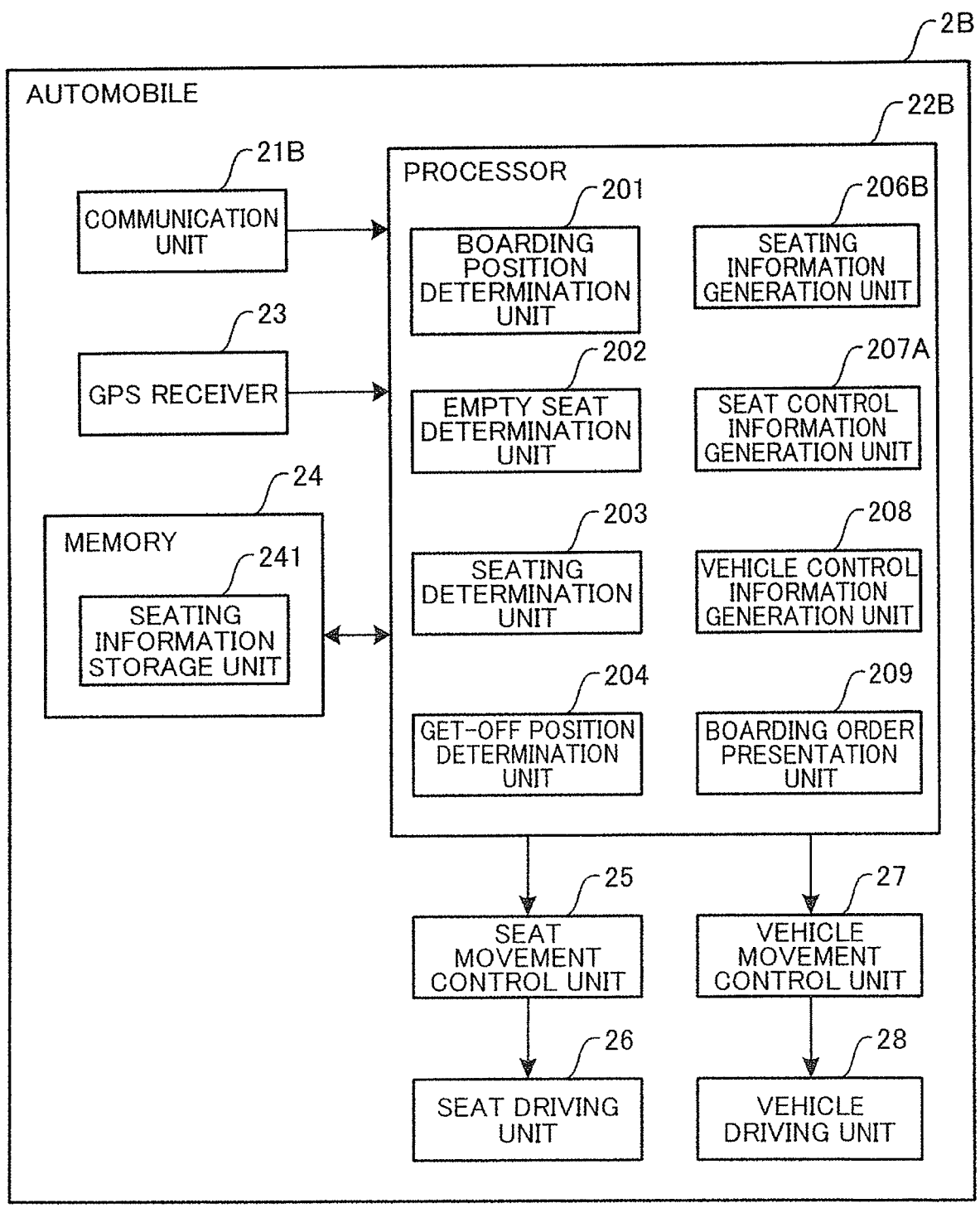
FIG. 19 is a block diagram showing a configuration of an automobile according to the third embodiment of the present disclosure.

FIG. 19 is a block diagram showing a configuration of the automobile according to the third embodiment of the present disclosure.

The automobile 2B shown in FIG. 19 includes a communication unit 21B, a processor 22B, a GPS receiver 23, a memory 24, a seat movement control unit 25, a seat driving unit 26, a vehicle movement control unit 27, and a vehicle driving unit 28. In FIG. 19, the same components as those of the automobiles in the first embodiment and the second embodiment are given the same reference signs to omit descriptions thereof.

The communication unit 21B receives the transport plan information and the seat position information transmitted by the terminal apparatus 1B. The communication unit 21B obtains seat position information indicative of assignment of the seat positions respectively to the plurality of subjects to be transported.

In a case where the transport type is the second transport type, the communication unit 21B also receives boarding order information indicative of a boarding order of the plurality of subjects to be transported by the automobile 2B from the terminal apparatus 1B. The communication unit 21B obtains the boarding order information indicative of a boarding order of the plurality of subjects to be transported.

The processor 22B includes a boarding position determination unit 201, an empty seat determination unit 202, a seating determination unit 203, a get-off position determination unit 204, a seating information generation unit 206B, a seat control information generation unit 207A, a vehicle control information generation unit 208, and a boarding order presentation unit 209.

In a case where the transport type is the second transport type, at the time of boarding of the plurality of subjects, the boarding order presentation unit 209 causes the presentation apparatus 4 to present the boarding order information received by the communication unit 21B. After an empty seat has been moved to the entrance at the transport source, the boarding order presentation unit 209 outputs the boarding order information to the communication unit 21B. The communication unit 21B transmits the boarding order information to the presentation apparatus 4. The presentation apparatus 4 displays the received boarding order information.

The boarding order presentation unit 209 may cause the presentation apparatus 4 to present the boarding order of the plurality of subjects or cause the presentation apparatus 4 to present a subject to board next according to the boarding order information.

Although in the third embodiment, the presentation apparatus 4 displays the boarding order information, the present disclosure is not particularly limited thereto, and the presentation apparatus 4 may output the boarding order information in voice.

When determination is made that a boarding subject has been seated, the seating information generation unit 206B generates seating information which correlates the subject boarding according to the order indicated by the boarding order information presented by the boarding order presentation unit 209 with the seat being seated.

Subsequently, description will be made of operation of the terminal apparatus 1B according to the third embodiment of the present disclosure.

The operation of the terminal apparatus 1B in the third embodiment of the present disclosure is the same as the operation of the terminal apparatus 1A of the second embodiment shown in FIG. 12.

However, in a case where the transport type whose input is accepted in step S51 is the second transport type, the input unit 12B accepts input, by the operator, of the boarding order information indicative of the boarding order of the plurality of subjects at the transport source (boarding position) after processing of step S56. Then, in step S60, the communication unit 15B transmits, to the automobile 2B, the transport plan information created by the transport plan creating unit 101, the seat position information created by the seat assignment creating unit 102, and the boarding order information input by the input unit 12B.

Subsequently, description will be made of operation of the automobile 2B according to the third embodiment of the present disclosure.

Figure 20:
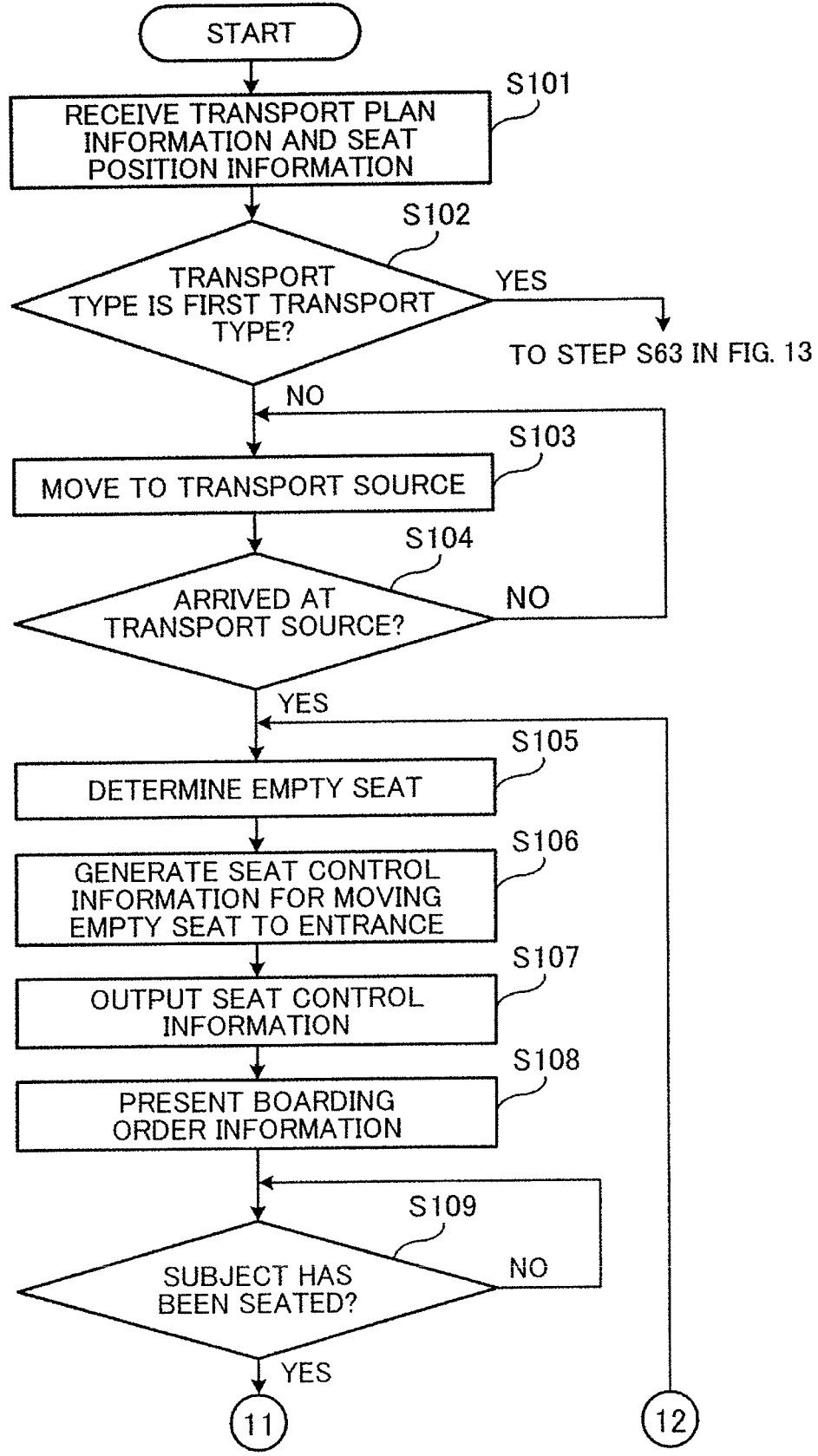
FIG. 20 is a first flow chart for describing operation of the automobile according to the third embodiment of the present disclosure.
Figure 21:
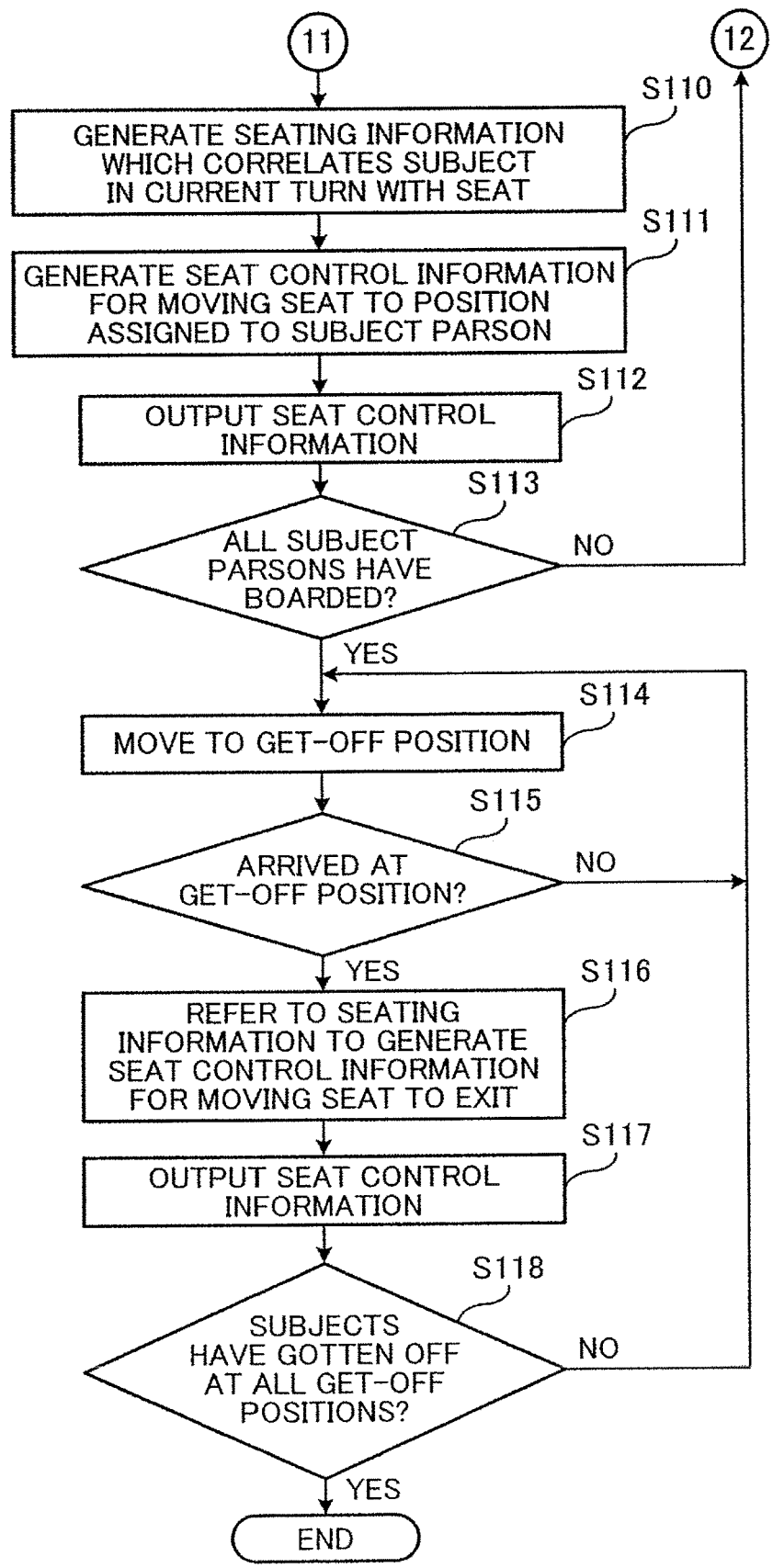
FIG. 21 is a second flow chart for describing operation of the automobile according to the third embodiment of the present disclosure.

FIG. 20 is a first flow chart for describing the operation of the automobile according to the third embodiment of the present disclosure, and FIG. 21 is a second flow chart for describing the operation of the automobile according to the third embodiment of the present disclosure.

First, in step S101, the communication unit 21B receives the transport plan information and the seat position information transmitted by the terminal apparatus 1B. In a case where the transport type included in the transport plan information is the second transport type, the communication unit 21B further receives the boarding order information.

Next, in step S102, the vehicle control information generation unit 208 determines whether or not the transport type included in the transport plan information received by the communication unit 21B is the first transport type.

Here, when determination is made that the transport type is the first transport type (YES in step S102), the processing proceeds to step S63 in FIG. 13. Thereafter, the processing of step S63 to step S77 shown in FIG. 13 and FIG. 14 is conducted.

On the other hand, when determination is made that the transport type is not the first transport type, i.e., when determination is made that the transport type is the second transport type (NO in step S102), the vehicle movement control unit 27 causes the automobile 2B to move to the transport source as a boarding position of the plurality of subjects in step S103.

Since processing of step S103 to step S107 is the same as the processing of step S78 to step S82 in FIG. 15, description thereof will be omitted.

Next, in step S108, the boarding order presentation unit 209 causes the presentation apparatus 4 to present the boarding order information received by the communication unit 21B. In other words, the boarding order presentation unit 209 outputs the boarding order information to the communication unit 21B. The communication unit 21B transmits the boarding order information to the presentation apparatus 4. The presentation apparatus 4 displays the received boarding order information.

Next, in step S109, the seating determination unit 203 determines whether or not the subject boarding from the entrance has been seated on an empty seat. Here, when determination is made that the subject has not been seated on the empty seat (NO in step S109), the determination of step S109 will be repeated until the subject is seated on the empty seat.

On the other hand, when determination is made that the subject has been seated on the empty seat (YES in step S109), the seating information generation unit 206B generates seating information which correlates a subject in a current turn in the boarding order information with a seat being seated in step S110. The seating information generation unit 206B stores the generated seating information in the seating information storage unit 241.

Since processing of step S111 to step S118 is the same as the processing of step S86 to step S93 in FIG. 15 and FIG. 16, description thereof will be omitted.

In the third embodiment, the communication unit 21B of the automobile 2B may obtain updated transport plan information during transport of a plurality of subjects using the transport plan information obtained from the terminal apparatus 1B. In this case, the seat control information generation unit 207A generates seat control information using the updated transport plan information. For example, in a case where the transport type is the second transport type, an order of get-off of subjects has been changed, and a transport route has been changed, when determination is made that the automobile 2B has arrived at the changed get-off position, the seat control information generation unit 207A generates seat control information for moving, to the exit, a seat correlated with a subject who will get off at the changed get-off position.

Additionally, the automobile 2B may further include an input unit which, in a case of the second transport type as a transport type, accepts change in the get-off order of a plurality of subjects, the change being made by a staff during transport of the plurality of subjects.

Although in the third embodiment, the automobile control system 100B includes the terminal apparatus 1B, the automobile 2B, and the presentation apparatus 4, the present disclosure is not particularly limited thereto. The automobile control system may include the terminal apparatus 1B, the automobile 2B, the presentation apparatus 4, and a server. In this case, the server is communicably connected to the terminal apparatus 1B and the automobile 2B via a network. The server includes a communication unit, the transport plan creating unit 101, the seat assignment creating unit 102, and the subject information storage unit 141. The terminal apparatus 1B includes none of the transport plan creating unit 101, the seat assignment creating unit 102, and the subject information storage unit 141. The communication unit 15B of the terminal apparatus 1B transmits, to the server, information indicative of a transport type, identification information of the plurality of subjects, and a position of a seat assigned to each of the plurality of subjects input by the input unit 12B. The communication unit of the server receives the information indicative of a transport type, the identification information of the plurality of subjects, and the position of a seat assigned to each of the plurality of subjects transmitted by the terminal apparatus 1B.

Then, the transport plan creating unit 101 of the server reads boarding position information, transport destination information, transport source information, and get-off position information correlated with the received identification information of the plurality of subjects from the subject information storage unit 141 to create transport route information based on the information indicative of a transport type, the transport source information of the plurality of subjects, and the get-off position information of the plurality of subjects. In a case where the transport type is the first transport type, the transport plan creating unit 101 of the server creates transport plan information including the information indicative of a transport type, the identification information of the plurality of subjects, the boarding position information of the plurality of subjects, the transport destination information of the plurality of subjects, and the transport route information, and in a case where the transport type is the second transport type, the transport plan creating unit 101 creates transport plan information including the information indicative of a transport type, the identification information of the plurality of subjects, the transport source information of the plurality of subjects, the get-off position information of the plurality of subjects, and the transport route information. The seat assignment creating unit 102 of the server creates seat position information indicative of assignment of the seat positions respectively to the plurality of subjects to be transported based on the respective positions of seats assigned to the plurality of subjects. The communication unit of the server transmits the transport plan information created by the transport plan creating unit 101 and the seat position information created by the seat assignment creating unit 102 to the automobile 2B.

Further, although in the third embodiment, the automobile control system 100B includes the terminal apparatus 1B, the automobile 2B, and the presentation apparatus 4, the present disclosure is not particularly limited thereto, and the automobile control system 100E may not include the terminal apparatus 1B but may include the automobile 2B, the presentation apparatus 4, and a server. In this case, the server is communicably connected to the automobile 2B via a network. The server includes a communication unit and the subject information storage unit 141. The automobile 2B includes an input unit, a display unit, a transport plan creating unit, and a seat assignment creating unit in addition to the configuration in FIG. 19. The input unit has the same configuration as that of the input unit 12B of the terminal apparatus 1B, the display unit has the same configuration as that of the display unit 11 of the terminal apparatus 1B, the transport plan creating unit has the same configuration as that of the transport plan creating unit 101 of the terminal apparatus 1B, and the seat assignment creating unit has the same configuration as that of the seat assignment creating unit 102 of the terminal apparatus 1B. The input unit of the automobile 2B accepts input of the information indicative of a transport type and the identification information of the plurality of subjects. The communication unit 21B of the automobile 2B transmits the identification information of the plurality of subjects input by the input unit to the server.

Then, the communication unit of the server receives the identification information of the plurality of subjects transmitted by the automobile 2B. The communication unit of the server reads the boarding position information, the transport destination information, the transport source information, and the get-off position information correlated with the received identification information of the plurality of subjects from the subject information storage unit 141 and transmits the information to the automobile 2B. The communication unit 21B of the automobile 2B receives the boarding position information, the transport destination information, the transport source information, and the get-off position information transmitted by the server. The transport plan creating unit of the automobile 2B creates transport route information based on the information indicative of a transport type, the transport source information of the plurality of subjects, and the get-off position information of the plurality of subjects. In a case where the transport type is the first transport type, the transport plan creating unit of the automobile 2B creates transport plan information including the information indicative of a transport type, the identification information of the plurality of subjects, the boarding position information of the plurality of subjects, the transport destination information of the plurality of subjects, and the transport route information, and in a case where the transport type is the second transport type, the transport plan creating unit creates transport plan information including the information indicative of a transport type, the identification information of the plurality of subjects, the transport source information of the plurality of subjects, the get-off position information of the plurality of subjects, and the transport route information. The seat assignment creating unit of the automobile 2B creates seat position information indicative of assignment of the seat positions respectively to the plurality of subjects to be transported based on the positions of the seats respectively assigned to the plurality of subjects. The automobile 2B conducts the same processing as that of the above third embodiment after creating the seat position information.

Also in the third embodiment, the automobile 2B may include the presentation apparatus 4, for example, may include the presentation apparatus 4 at the entrance of the automobile 2B.

Although in the third embodiment, seat positions are respectively assigned in advance to a plurality of boarding subjects, the present disclosure is not particularly limited thereto. A position of a seat for each of the plurality of subjects to board may not be assigned in advance but the respective seats for the plurality of subjects who have boarded may be moved to arbitrary positions as in the first embodiment.

Also in the third embodiment, the processor 22B of the automobile 2B may further include a person determination unit which determines a subject boarding from the entrance, and a boarding order determination unit which determines whether or not a subject determined by the person determination unit coincides with an order indicated by the boarding order information. In this case, the boarding order presentation unit 209 may cause the presentation apparatus 4 to present a determination result as to whether or not the subject determined by the person determination unit coincides with the order indicated by the boarding order information.

Also in the first to third embodiments, in a case of moving a seat seated by a subject, the seat movement control unit 25 may determine whether or not the automobiles 2, 2A, and 2B are stopped. Specifically, in a case where the automobiles 2, 2A, and 2B are determined to be stopped, the seat movement control unit 25 moves the seat seated by the subject and in a case where the automobiles 2, 2A, and 2B are determined not to be stopped, the seat movement control unit 25 does not move the seat seated by the subject. This enables improvement in safety of subjects.

Also in the first to third embodiments, the automobiles 2, 2A, and 2B may further include an input unit for accepting input, by a staff, of an instruction to move a seat. In this case, when the instruction to move a seat is input by the input unit, the seat movement control unit 25 moves a seat and when the instruction to move a seat is not input by the input unit, the seat movement control unit 25 does not move the seat. In this manner, for example, a staff checks whether or not a seat can be moved, so that safety of subjects can be improved.

While the apparatus of the present disclosure has been described with respect to the embodiments in the foregoing, the present disclosure is not limited to the embodiments. Possible various modifications made by those skilled in the art to the embodiments, and modes made up of a combination of the components in the different embodiments can be included within one or a plurality of aspects of the present disclosure without departing from the gist of the present disclosure.

Although the above embodiments have been described with respect to a vehicle for care, the embodiments can be applied to vehicles such as a shared taxi and a school bus from which a plurality of persons gets on/off, and to a transport vehicle having seats replaced by a housing unit for carrying articles.

The processing conducted in the transport plan creating unit 101, the boarding position determination unit 201, the empty seat determination unit 202, the seating determination unit 203, the get-off position determination unit 204, and the person determination unit 205 may use machine learning. Examples of machine learning include supervised learning in which a relation between input and output is learned using teacher data with a label (output information) applied to input information, unsupervised learning in which data structure is made up only of unlabeled input, semi-supervised learning using both labelled and unlabeled inputs, and reinforcement learning in which, by obtaining feedback (reward) on an action selected from observation results of a state, a continuous action that can obtain a highest reward is learned. As a specific method of machine learning, there are presented neural network (including deep learning using a multilayer neural network), genetic programming, decision tree, Bayesian network, support vector machine (SVM), and the like. In the present disclosure, any of the above-described specific examples may be used.

In each of the above embodiments, each component may be configured with dedicated hardware or realized by executing a software program suitable for each component. Each component may be realized by reading and executing a software program recorded in a recording medium such as a hard disk or a semiconductor memory by a program execution unit such as a CPU or a processor.

A part or all of the functions of the apparatuses according to the embodiments of the present disclosure are realized as large scale integration (LSI) which is typically an integrated circuit. These circuits may be each individually formed as one chip, or a part or all of the circuits may be formed as one chip. The integrated circuits may not necessarily be LSI but be realized as dedicated circuits or general-purpose processors. It is also possible to use a field programmable gate array (FPGA) which is programmable after manufacturing of LSI, or a reconfigurable processor in which connection and setting of circuit cells inside LSI can be reconfigured.

A part or all of the functions of the apparatuses according to the embodiments of the present disclosure may be also realized by execution of a program by a processor such as a CPU.

Numerals used above are all for illustrative purpose only for specifically describing the present disclosure and the present disclosure is not limited by the exemplified numerals.

The order of execution of the steps shown in the above flow charts is for illustrative purpose only for specifically describing the present disclosure and any order other than the above can be applied as long as the same effect can be obtained. A part or all of the above steps may be executed simultaneously (in parallel) with other steps.

The information processing apparatus, the information processing method, and the non-transitory computer-readable recording medium for recording an information processing program according to the present disclosure enable a person to be transported to smoothly board or get off from a mobile body, and are useful as an information processing apparatus which controls movement of a plurality of seats provided in a mobile body, an information processing method, and a non-transitory computer-readable recording medium for recording an information processing program.

This application is based on Japanese Patent application No. 2018-146009 filed in Japan Patent Office on Aug. 2, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing apparatus comprising a processor which is configured to:
   obtain transport plan information for transport of a plurality of persons using a mobile body;
   generate control information for moving, to an entrance or an exit, a seat specified by the transport plan information among a plurality of seats provided in the mobile body by using the transport plan information; and
   output the control information to a control apparatus and control movement of the plurality of seats.

2. The information processing apparatus according to claim 1, wherein
   the transport plan information includes information indicative of a transport type, and
   the processor generates the control information for moving, to the entrance or the exit, a seat specified according to the transport type among the plurality of seats.

3. The information processing apparatus according to claim 2, wherein the transport plan information includes information indicative of respective boarding positions of the plurality of persons to be transported, and
   in a case where the transport type is a first transport type in which the plurality of persons are allowed to board at the respective boarding positions,
   (i) the processor determines whether or not the mobile body has arrived at the boarding position,
   (ii) the processor determines an empty seat among the plurality of seats, and
   (iii) when determination is made that the mobile body has arrived at the boarding position, the processor generates the control information for moving the determined empty seat to the entrance.

4. The information processing apparatus according to claim 3, wherein
the transport plan information includes information indicative of the plurality of persons to be transported, respectively,
the processor is further configured to:
obtain seat position information indicative of assignment of seat positions respectively to the plurality of persons to be transported;
determine a person boarding at the boarding position; and
determine whether or not the person determined to board has been seated on a seat, and
when determination is made that the person determined to board has been seated on a seat, the processor generates the control information for moving the seat seated by the person determined to board to a position assigned to the person determined to board according to the seat position information.

5. The information processing apparatus according to claim 3, wherein
the transport plan information includes information indicative of a get-off position of each of the plurality of persons to be transported,
the processor is further configured to:
determine whether or not the mobile body has arrived at the get-off position, and
when determination is made that the mobile body has arrived at the get-off position, the processor generates the control information for moving, to the exit, at least a seat correlated with a person who gets off at the get-off position.

6. The information processing apparatus according to claim 5, the processor is further configured to:
obtain get-off order information indicative of a get-off order of the plurality of persons to be transported by the mobile body,
wherein when the determination is made that the mobile body has arrived at the get-off position, the processor generates the control information for moving, to the exit, a seat of a person who gets off at the get-off position according to the order indicated by the get-off order information.

7. The information processing apparatus according to claim 2,
wherein the transport plan information includes information indicative of each of the plurality of persons to be transported, and
in a case where the transport type is a first transport type in which the plurality of persons are allowed to board at respective boarding positions,
the processor is further configured to:
(a) determine an empty seat among the plurality of seats,
(b) generate the control information for moving a determined empty seat to the entrance,
(c) determine a person boarding from the entrance,
(d) determine whether or not the person determined to board has been seated on the determined empty seat, and
(e) when determination is made that the person determined to board has been seated, generate seating information which correlates the person determined to board with the seat being seated.

8. The information processing apparatus according to claim 7, the processor is further configured to:
obtain seat position information indicative of assignment of seat positions respectively to the plurality of persons to be transported,
wherein the processor generates the control information for moving a seat correlated with the person determined to board to a position assigned to the person determined to board according to the seat position information.

9. The information processing apparatus according to claim 7, the processor is further configured to:
obtain boarding order information indicative of a boarding order of each of the plurality of persons to be transported; and
cause a presentation apparatus to present the boarding order information.

10. The information processing apparatus according to claim 9, the processor is further configured to:
determine whether or not the person determined to board coincides with an order indicated by the boarding order information,
wherein the processor causes the presentation apparatus to present a determination result as to whether or not the person determined to board coincides with the order indicated by the boarding order information.

11. The information processing apparatus according to claim 7, wherein
the transport plan information includes information indicative of a get-off position of each of the plurality of persons to be transported,
the processor is further configured to:
determine whether or not the mobile body has arrived at the get-off position, and
when determination is made that the mobile body has arrived at the get-off position, the processor generates the control information for moving, to the exit, a seat correlated with a person who gets off at the get-off position.

12. The information processing apparatus according to claim 1, wherein
the processor obtains updated transport plan information during transport of the plurality of persons using the obtained transport plan information, and
the processor generates the control information using the updated transport plan information.

13. An information processing method comprising, by a computer:
obtaining transport plan information for transport of a plurality of persons using a mobile body;
generating control information for moving, to an entrance or an exit, a seat specified by the transport plan information among a plurality of seats provided in the mobile body by using the transport plan information; and
outputting the control information to a control apparatus and controlling movement of the plurality of seats.

14. A non-transitory computer-readable recording medium and a computer for recording an information processing program that causes the computer to function to:
obtain transport plan information for transport of a plurality of persons using a mobile body;
generate control information for moving, to an entrance or an exit, a seat specified by the transport plan information among a plurality of seats provided in the mobile body by using the transport plan information; and
output the control information to a control apparatus and control movement of the plurality of seats.

* * * * *